United States Patent
Vines et al.

(10) Patent No.: US 12,156,494 B2
(45) Date of Patent: Dec. 3, 2024

(54) AUTONOMOUS LAWN MOWER AND A SYSTEM FOR NAVIGATING THEREOF

(71) Applicant: TECHTRONIC CORDLESS GP, Anderson, SC (US)

(72) Inventors: Brian Vines, Ho Chu Minh (VN); Xing Zhang, Guangdong (CN); Benjamin Edgar Montgomery, Dau Giay Town (VN); Syed Kashif Hassan, Guangdong (CN)

(73) Assignee: Techtronic Cordless GP, Anderson, SC (US)

( * ) Notice: Subject to any disclaimer, the term of this patent is extended or adjusted under 35 U.S.C. 154(b) by 824 days.

(21) Appl. No.: 17/269,511

(22) PCT Filed: Aug. 28, 2018

(86) PCT No.: PCT/CN2018/102780
§ 371 (c)(1),
(2) Date: Feb. 18, 2021

(87) PCT Pub. No.: WO2020/041985
PCT Pub. Date: Mar. 5, 2020

(65) Prior Publication Data
US 2021/0176915 A1  Jun. 17, 2021

(51) Int. Cl.
*G05D 1/00* (2024.01)
*A01D 34/00* (2006.01)
(Continued)

(52) U.S. Cl.
CPC ........... *A01D 34/008* (2013.01); *A01D 34/03* (2013.01); *A01D 34/64* (2013.01); *A01D 34/74* (2013.01);
(Continued)

(58) Field of Classification Search
CPC ...... A01D 34/008; A01D 34/03; A01D 34/63; A01D 34/74; A01D 34/84; A01D 2101/00;
(Continued)

(56) References Cited

U.S. PATENT DOCUMENTS 5,850,135 A * 12/1998 Kuki ..................... B60L 53/665
                                                      320/108
9,072,218 B2    7/2015  Johnson et al.
(Continued)

FOREIGN PATENT DOCUMENTS

CN    105910604 A   8/2016
CN    108008728 A   5/2018
(Continued)

OTHER PUBLICATIONS

TTI (Macao Commercial Offshore) Limited; International Patent Application No. PCT/CN2018/102780; International Search Report; May 29, 2019; (2 pages).
(Continued)

*Primary Examiner* — Dale Moyer
(74) *Attorney, Agent, or Firm* — Dority & Manning, P.A.

(57) ABSTRACT

A system and method for an autonomous lawn mower comprising a mower body having at least one motor arranged to drive a cutting blade and to propel the mower body on an operating surface via a wheel arrangement, wherein the mower body includes a navigation system arranged to assist a controller to control the operation of the mower body within a predefined operating area, wherein the mower body further includes a signal detecting module arranged to detect a signal representative of a navigational marker.

49 Claims, 36 Drawing Sheets

(51) Int. Cl.
*A01D 34/03* (2006.01)
*A01D 34/64* (2006.01)
*A01D 34/74* (2006.01)
*A01D 34/84* (2006.01)
*A01D 101/00* (2006.01)

(52) U.S. Cl.
CPC ........... *A01D 34/84* (2013.01); *G05D 1/0219* (2013.01); *G05D 1/0225* (2013.01); *G05D 1/0265* (2013.01); *A01D 2101/00* (2013.01)

(58) Field of Classification Search
CPC .. G05D 1/0219; G05D 1/0225; G05D 1/0265; G05D 2201/0208
See application file for complete search history.

(56) References Cited

U.S. PATENT DOCUMENTS

| | | | | |
|---|---|---|---|---|
| 2005/0278068 | A1* | 12/2005 | Hong | G06T 7/70 700/259 |
| 2008/0109126 | A1* | 5/2008 | Sandin | B60L 50/62 56/229 |
| 2011/0234153 | A1 | 9/2011 | Abramson | |
| 2013/0018527 | A1* | 1/2013 | Bernini | A01D 34/008 701/2 |
| 2014/0327389 | A1* | 11/2014 | Elonsson | H02J 7/0042 901/1 |
| 2015/0189830 | A1* | 7/2015 | Jagenstedt | B60L 15/20 901/1 |
| 2015/0366137 | A1* | 12/2015 | Markusson | B60L 50/52 320/107 |
| 2017/0113342 | A1 | 4/2017 | Abramson | |
| 2017/0282735 | A1* | 10/2017 | Yamamura | G05D 1/0225 |
| 2018/0077861 | A1* | 3/2018 | Lego | A01D 34/4165 |
| 2018/0146615 | A1* | 5/2018 | Kuriyagawa | A01D 34/64 |
| 2019/0208700 | A1* | 7/2019 | Hahn | G05D 1/0225 |
| 2019/0216011 | A1* | 7/2019 | Hahn | A01D 34/74 |
| 2019/0216014 | A1* | 7/2019 | Hahn | G05D 1/027 |
| 2019/0222043 | A1* | 7/2019 | Jiao | B25J 5/007 |
| 2019/0258267 | A1* | 8/2019 | Hahn | B60L 50/66 |
| 2019/0307064 | A1* | 10/2019 | Hong | A01D 34/64 |

FOREIGN PATENT DOCUMENTS

| | | |
|---|---|---|
| CN | 108185896 A | 6/2018 |
| EP | 2806325 A2 | 11/2014 |
| EP | 3844585 B1 | 7/2021 |

OTHER PUBLICATIONS

Canadian Office Action Corresponding with Application No. 3,110,587 on Aug. 10, 2023 (1 page).
European Search Report Corresponding with Application No. EP23167037 on Jun. 20, 2023 (2 pages).
Mexican Office Action Corresponding with Application No. MX/a/2021/001907 on Dec. 18, 2023 (1 page).

* cited by examiner

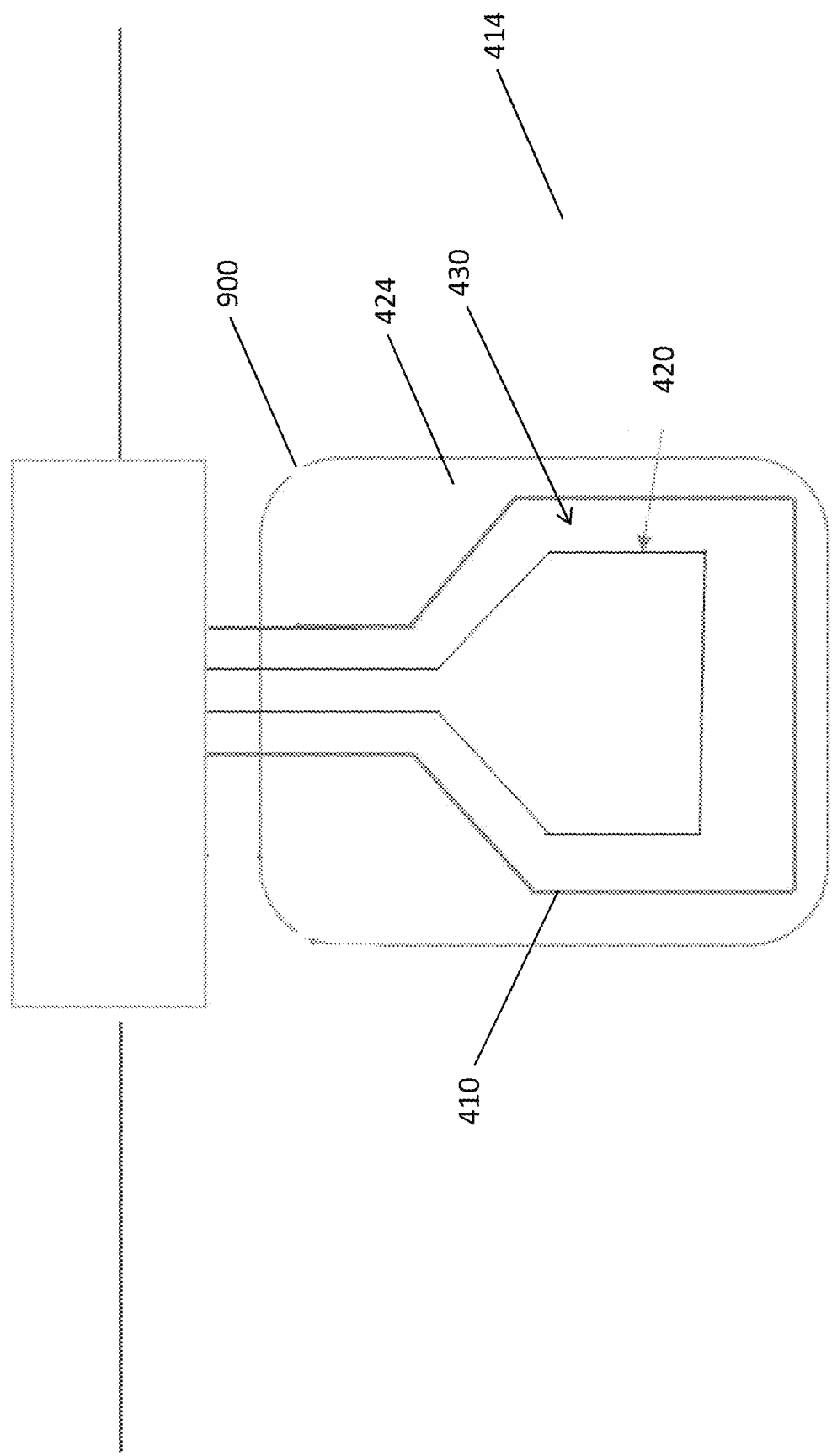

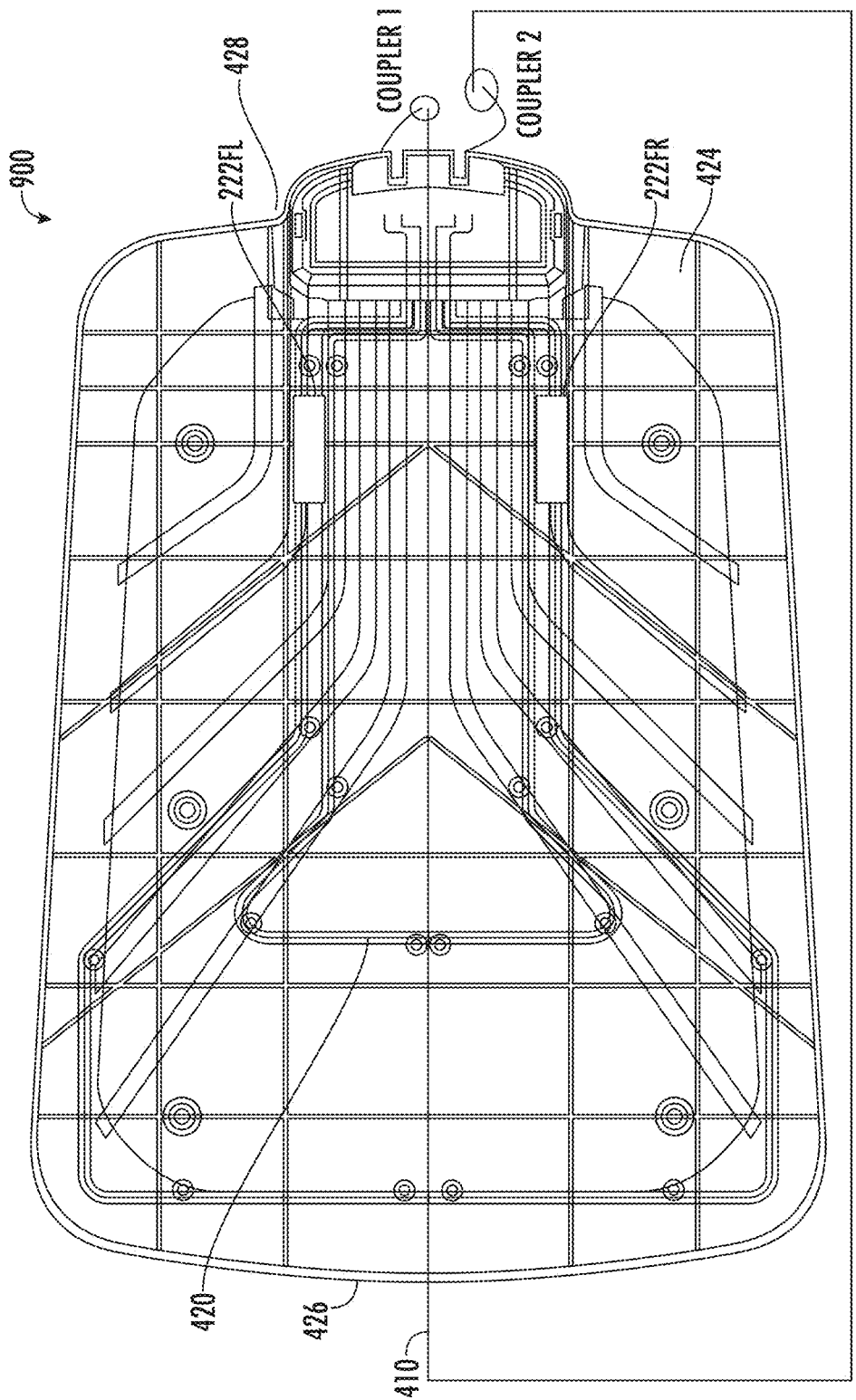

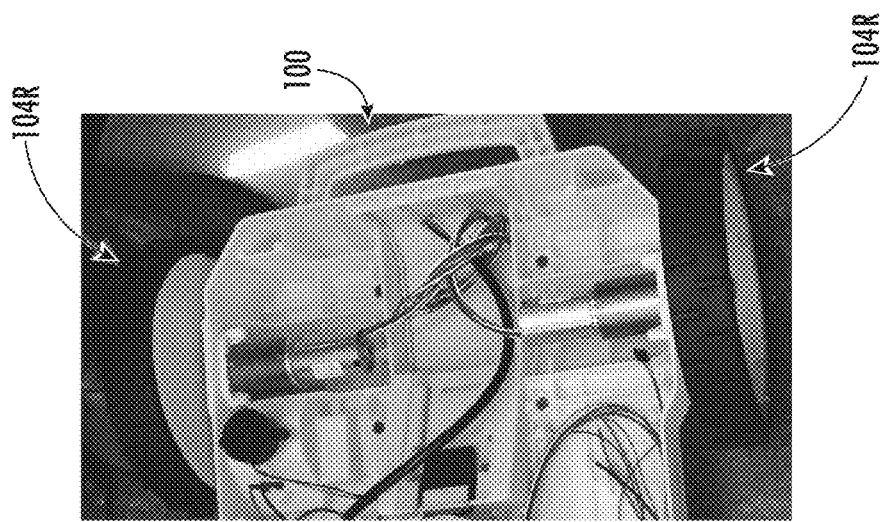
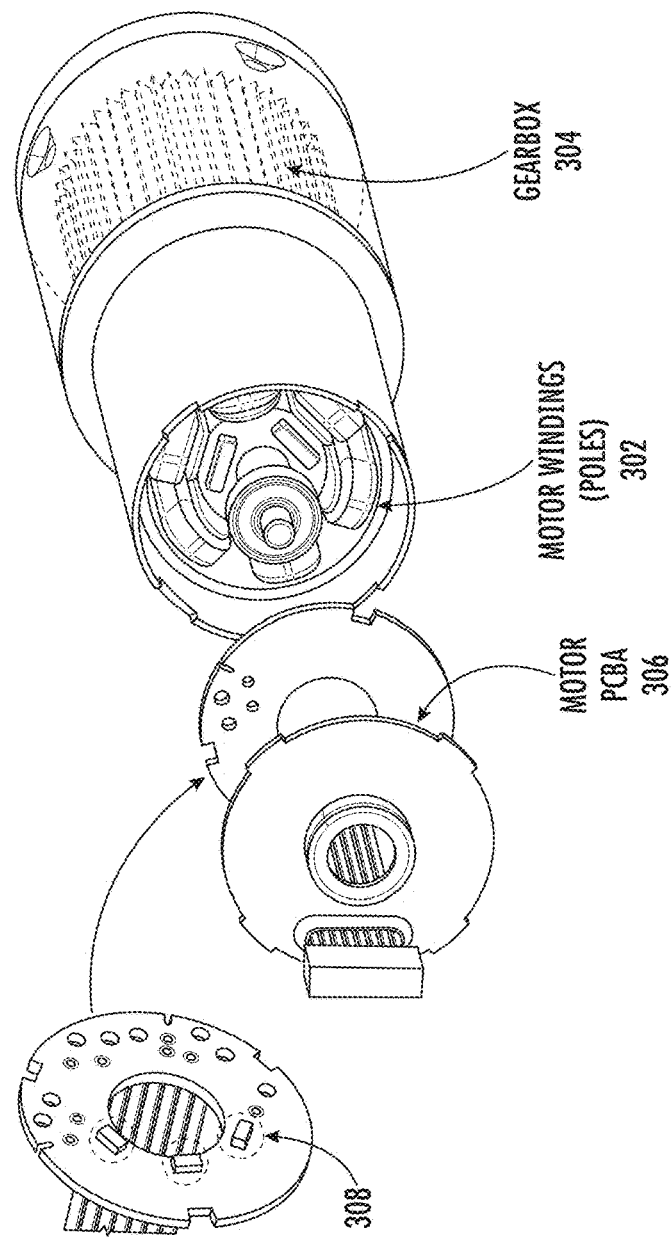
FIG. 17

AUTONOMOUS LAWN MOWER AND A SYSTEM FOR NAVIGATING THEREOF

This application is a National Stage Patent Application of PCT/CN2018/102780, filed on Aug. 28, 2018, the disclosure of which is incorporated by reference herein in its entirety.

TECHNICAL FIELD

The present invention relates to an autonomous lawn mower and a system for navigating thereof, and particularly, although not exclusively, to an autonomous lawn mower which uses a navigating system to control the navigation of the autonomous lawn mower during its operation.

BACKGROUND

The maintenance of lawns requires a significant amount of manual labour including constant watering, fertilizing and mowing of the lawn to maintain a strong grass coverage. Although watering and fertilizing can sometimes be handled with minimal effort by use of a sprinkler or irrigation system, the mowing process is one process that demands a significant amount of physical effort from gardeners.

Designers and manufacturers of lawn mowers have attempted to manufacture autonomous lawn mowers for some time to replace the traditional push pull mowers. However, the unpredictability of a landscape together with the cost of creating an accurate and usable product has meant many autonomous lawn mowers simply do not perform at an adequate level of performance.

This is in part due to the fact that gardens come in many different varieties and shapes, with different elevations and profiles. Thus the autonomous mowers have had significant trouble in navigating these different types of terrain. In turn, many push mowers are still preferred by users as their performance and control can still be manually controlled to overcome problems associated with different landscape profiles.

SUMMARY OF THE INVENTION

In the light of the foregoing background, it is an object of the present invention to provide an alternate lawn mower which eliminates or at least alleviates the above technical problems.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

In accordance with a first aspect of the present invention, there is provided an autonomous lawn mower comprising:
  a mower body having at least one motor arranged to drive a cutting blade and to propel the mower body on an operating surface via a wheel arrangement, wherein the mower body includes a navigation system arranged to assist a controller to control the operation of the mower body within a predefined operating area;
  wherein the mower body further includes a signal detecting module arranged to detect a signal representative of a navigational marker.

In an embodiment of the first aspect, the navigational marker includes the location of an obstacle or boundary.

In an embodiment of the first aspect, the navigation system determines a position of the mower body within the predefined operating area based on the location of the obstacle or boundary.

In an embodiment of the first aspect, the autonomous lawn mower further includes a signal generating module arranged to generate the signal in the form of a loop.

In an embodiment of the first aspect, the signal detecting module includes a sensor arranged to detect the magnitude of the signal loop.

In an embodiment of the first aspect, the signal generating module generates a first aforesaid signal loop within the predefined operating area whereby the position of the mower body relative to the predefined operation area is determined by the controller based on the magnitude of the first signal loop detected by the sensor.

In an embodiment of the first aspect, the first aforesaid signal loop is emitted about the boundary of the predefined operation area.

In an embodiment of the first aspect, the signal generating module is positioned on a detachable docking module for detachably receiving the mower body.

In an embodiment of the first aspect, the detachable docking module generates a second aforesaid signal loop within a predefined docking area about the detachable docking module whereby the position of the mower body relative to the detachable docking module within the predefined docking area is determined by the controller based on the magnitude of the second signal loop detected by the sensor.

In an embodiment of the first aspect, the first and second signal loops are time shifted pulses with the same frequency.

In an embodiment of the first aspect, the sensor receives the pulse of the first and second signal loops when the mower body is at a position inside the predefined operating area and the predefined docking area.

In an embodiment of the first aspect, the controller identifies the first and second signal loops individually based on the time shift between the pulses of the first and second signal loops.

In an embodiment of the first aspect, the first signal loop includes a bidirectional current pulse.

In an embodiment of the first aspect, the sensor receives only the pulse of the first signal loop when the mower body is at a position inside the predefined operating area and outside the predefined docking area.

In an embodiment of the first aspect, the sensor detects two opposite polarity of the first signal loop when the mower body is positioned at a position inside the predefined operating area and a position outside the predefined operating area respectively.

In an embodiment of the first aspect, the sensor detects a first polarity of the first signal loop when the mower body is at a position inside the predefined operating area.

In an embodiment of the first aspect, the sensor detects a second, opposite polarity of the first signal loop when the mower body is at a position outside the predefined operating area.

In an embodiment of the first aspect, the mower body includes a plurality of aforesaid sensors, whereby the controller terminates the movement of the mower body upon all sensors are sandwiched between the first and second signal loops.

In an embodiment of the first aspect, the detachable docking module further includes a magnetic detection module for detecting the orientation of the mower body with respect to the detachable docking module.

In an embodiment of the first aspect, the magnetic detection module is a magnetomer.

In an embodiment of the first aspect, the second signal loop includes a unidirectional current pulse.

In an embodiment of the first aspect, the mower body, in a docking operation, is arranged to move towards a predefined docking area at the detachable docking module along the boundary of the predefined operation area.

In an embodiment of the first aspect, the mower body includes a plurality of aforesaid sensors, with at least two sensors each positioned on two opposite sides of the boundary of the predefined operation area respectively for detecting the magnitude of the first signal loop individually during the docking operation.

In an embodiment of the first aspect, the individual position of the two sensors relative to the boundary of the predefined operation area is determined by the controller based on the detected magnitude.

In an embodiment of the first aspect, the position of the mower body relative to the boundary of the predefined operation area is determined by the controller based on the individual position of the sensors relative to the boundary of the predefined operation area.

In an embodiment of the first aspect, the first signal loop detected by the sensors includes equal magnitude yet opposite polarity when the mower body is bisected by the boundary of the predefined operation area.

In an embodiment of the first aspect, the detachable docking module overlaps a portion of the boundary of the predefined operation area.

In an embodiment of the first aspect, the boundary of the predefined operation area bisects the detachable docking module in a longitudinal direction along which the mower body moves towards the predefined docking area.

In an embodiment of the first aspect, the mower body further includes an actuator for terminating the operation of the mower and, in response to the termination of the mower operation, releasing a portion of the mower body from a closed position at which a user control interface is covered to an opened position at which the user control interface is exposed.

In an embodiment of the first aspect, the actuator is arranged to actuate a micro switch for releasing a portion of the mower body from the closed position.

In an embodiment of the first aspect, the actuator is in communication with a magnetic sensor arranged to sense the movement of the cover between the closed position and the opened position.

In an embodiment of the first aspect, the mower body further includes a cutter module arranged to trim the edges of the predefined operating area.

In an embodiment of the first aspect, the cutting module includes at least two cutting bars movable in a reciprocating manner.

In an embodiment of the first aspect, the cutting bars are each driven by a driving motor respectively.

In an embodiment of the first aspect, the cutting module is placed at a position underneath the mower body and transverse to the longitudinal axis of the mower body.

In an embodiment of the first aspect, the mower body further includes a height adjustment system arranged to assist the controller to restrict the operation of the cutting blade within a predefined operating height.

In an embodiment of the first aspect, the height adjustment system includes one or more sensors arranged to detect the presence of the cutting blade at the predetermined vertical position.

In an embodiment of the first aspect, the height adjustment system is arranged to communicate with the controller for terminating the operation of the cutting blade upon the cutting blade reached the predetermined vertical position.

In an embodiment of the first aspect, the navigation system further includes an odometry module arranged to track the movement of the mower body on the operating surface.

In an embodiment of the first aspect, the rate of rotation of each of the wheels is applied to a transmission ratio to determine the rotation distance of the wheel.

In an embodiment of the first aspect, the odometry module is arranged to transmit the rotation distance and the direction of rotation of each wheel to the navigation system.

In an embodiment of the first aspect, the detachable docking module is arranged to provide battery charging to the mower body.

In an embodiment of the first aspect, the detachable docking module includes a rotatable member arranged to contact the mower body with a predefined vertical offset relative to the detachable docking module for battery charging.

In an embodiment of the first aspect, the rotatable member extends laterally from the detachable docking module.

In an embodiment of the first aspect, the rotatable member is pivotable about a horizontal axis that is parallel to the operating surface.

In an embodiment of the first aspect, the mower body includes an opening for receiving the rotatable member.

In an embodiment of the first aspect, the detachable docking module is provided a pair of resilient means for acting against the opposite sides of the rotatable member to maintain the orientation of the rotatable member.

In an embodiment of the first aspect, the rotatable member is provided a protective gasket for sealing between the rotatable member and the mower body and for flexible rotation of the rotatable member.

In an embodiment of the first aspect, the mower body further includes a blade adjustment system arranged to adjust the vertical position of the cutting blade along its rotating axis.

BRIEF DESCRIPTION OF THE DRAWINGS

Embodiments of the present invention will now be described, by way of example, with reference to the accompanying drawings in which:

FIG. 11 is a partial view of FIG. 4 illustrating the arrangement of the boundary wire loop and the docking wire loop about the docking station of the autonomous lawn mower of FIG. 1;

FIG. 16B is a diagram showing another example implementation of a docking station with boundary wire loop and docking wire loop;

FIG. 17 is a diagram illustrating an example implementation of an odometry module on a pair of opposing wheels of the autonomous lawn mower of FIG. 1;

DETAILED DESCRIPTION OF THE PREFERRED EMBODIMENT

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
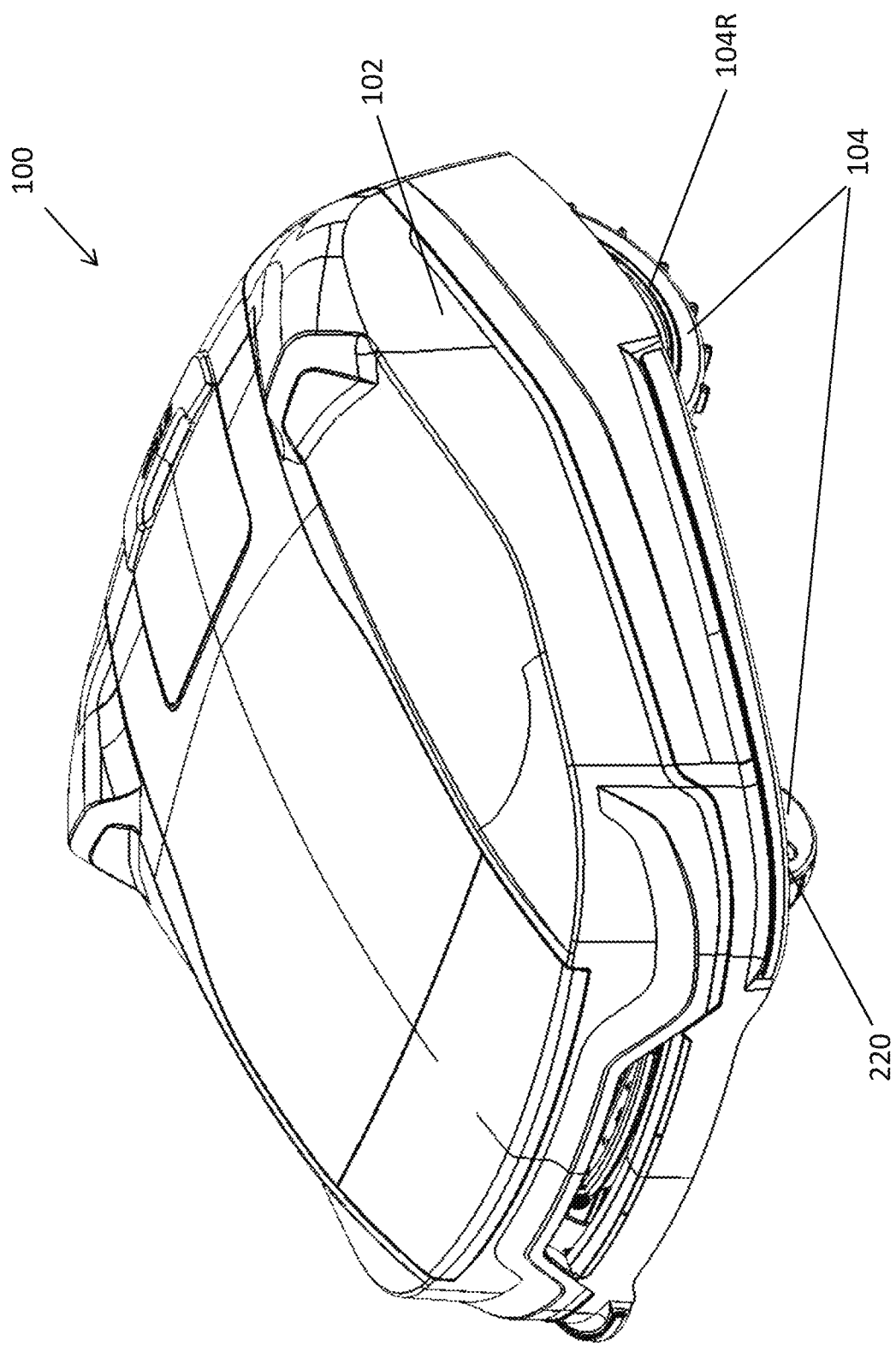
FIG. 1 is an illustration of an autonomous lawn mower in accordance with one embodiment of the present invention.

With reference to FIG. 1, there is provided an illustration of an autonomous lawn mower 100 comprising: a mower body 102 having at least one motor 212 arranged to drive a cutting blade 212b and to propel the mower body 102 on an operating surface via a wheel arrangement, wherein the mower body 102 includes a navigation system 204 arranged to assist a controller 202 to control the operation of the mower body 102 within a predefined operating area 414, wherein the mower body 102 further includes a signal detecting module 222 arranged to detect a signal representative of a navigational marker.

In this example, the autonomous lawn mower 100 is arranged to operate on a lawn or grass grown surface so as to cut the grass. This action is commonly known as "mow the lawn" and is often undertaken by gardeners and landscape workers to maintain a lawn surface. The term autonomous lawn mower 100 may also include any type of grass cutting device or lawn mower which can operate autonomously, that is, with minimum user intervention. It is expected that user intervention at some point is required to set up or initialize the mower 100 or to calibrate the mower 100 with specific commands, but once these procedures have been undertaken, the mower 100 is largely adapted to operate on its own until further commands are required or if servicing, calibration or error correction is required. Accordingly, autonomous lawn mowers 100 may also be known as automatic lawn mowers, self-driven lawn mowers, robotic lawn mowers or the like.

In this embodiment as shown in FIG. 1, the autonomous lawn mower 100, or referred to as the lawn mower or mower, includes a frame or housing 102 which supports the operating components of the mower 100. These operating components may include, without limitation at least one motor, such as an electric motor, which is arranged to drive the blades of the mower 100 so as to cut the grass of a lawn to which the mower 100 is mowing. The at least one motor may also be used to drive the mower 100 itself via the means of transmission systems, such as gearing mechanisms or gearboxes which transmit a driving force to its wheel arrangements 104, although preferably, as is the case of this embodiment, separate motors are used to drive the mower 100 along its operating surface with each rear wheel 104R having its own individual motor and gearbox. This is advantageous in that manoeuvring the mower 100 may be implemented by simple control of each of these motors. It is important to note that the term wheel arrangements may also include driving arrangements that are formed from various different types and combination of wheels, including tracks (such as in tank tracks), chains, belts (such as in snow belts) or other forms of driving arrangements.

Preferably, as shown in the embodiment of FIG. 1, the mower 100 includes a navigation system 204 which operates to locate and navigate the mower 100 around a working area 414 so that the mower 100 can cut the grass of a working area 414. The navigation system 204 may include a number of specific navigation modules each arranged to provide individual navigation information obtained for the mower 100. In turn, the navigation information obtained or determined by each of these navigation modules are then returned to the navigation system 204 for transmission to a controller 202. Upon processing of the navigation information by the controller 202, the controller 202 may then generate commands which are used to control the movement and operation of the mower 100 within a work or operation area.

These navigation modules may include at least the follow:
A signal detecting module 222 arranged to detect a signal representative of a navigational marker;
An odometry module 220 arranged to determine the distance travelled by the wheels 104 so as to assist in the determination of the location of the mower 100 from a starting point;
Other additional navigation modules (not shown) may also be implemented to communicate with the navigation system 204 so as to provide further input to the navigation system 204 to adjust and control the mower 100, including:
GPS sensors which can be used to obtain a GPS coordinate of the mower 100. In some examples, the mower 100 may be implemented to use "RTK GPS" or Real Time Kinematic GPS which includes two GPS modules, one fixed and one in the mower 100 in addition to advanced GPS information to determine the precise position of the mower 100 within the mowing area 414 and world;
Compass sensors to obtain a compass bearing of the mower 100;
Rain sensors or water sensors to detect if the immediate environment is subject to rain, high levels of moisture or entry of the mower 100 into a puddle of water and if so, adjust or terminate operation of the mower 100;
Edge sensors or cliff sensors to detect if the mower 100 has reached an edge or a cliff whereby any further movement may cause the mower 100 to experience a fall;
Light sensors to detect light or time of day and adjust operation accordingly, including the switching on of warning lights; and,
Other additional sensors and function modules, such as clock, WiFi, Bluetooth, GSM, RF, DECT, or any other communication protocol modules arranged to receive COMMUNICATION PROTOCOLS external information received via communications connections such as weather reports or remote commands to enhance and control the operation of the mower 100.

These navigation modules are each arranged to obtain, detect and determine a set of navigation related information, which are in turn arranged to be processed by a processor on the controller 202 to devise suitable commands to operate the mower 100. As it will be explained below with reference to FIGS. 8 and 9, in one example, the autonomous lawn mower 100 will operate by moving away from a docking station 900 as shown in FIGS. 11 to 16 which will form a start and return point for the mower 100. The mower 100, when departing the docking station 900 may then use the navigation system 204 to assist with navigating the mower 100 around a work or operation area 414 by cutting the lawn in the operating area 414, and then proceeding to navigate its way back to the docking station 900.

Figure 2:
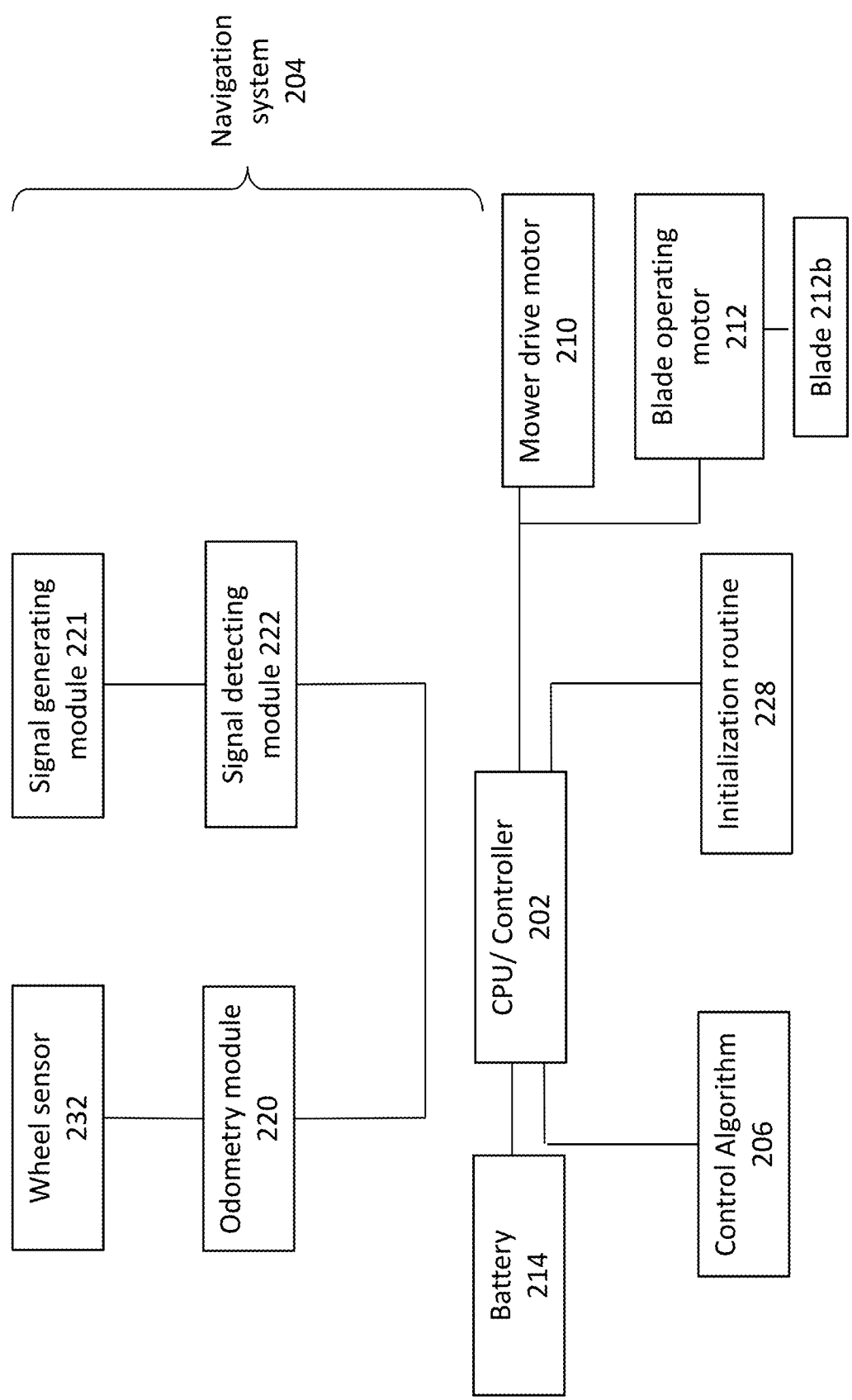
FIG. 2 is a block diagram illustrating an example of various control systems and modules of the autonomous lawn mower of FIG. 1.

With reference to FIG. 2, there is provided a block diagram of the autonomous lawn mower 100 which illustrates the components of the autonomous lawn mower 100. In this embodiment, the mower 100 includes a controller/processor 202 which may be implemented as a computing device, or as one or more control boards, with each having one or more processors arranged to receive and analyse the information received and to provide instructions to the mower 100 in order to operate the mower 100. Preferably, the controller/processor 202 is implemented with a main printed circuit board assembly (PCBA) arranged to have two processors on the PCBA and to operate together with an additional computing module. Several of the sensor PCBAs may also have their own individual Microcontroller units (MCUs).

The controller/processors 202 is arranged to receive navigation information from the navigation system 204 of the mower 100 and in turn, upon the receipt of this navigation information, will process the navigation information with existing information already accessible by the controller 202 such as the control algorithm 206 or predefined map of the operating area 414 to generate various commands to each of the mower 100 operating components, including the drive motors arranged to drive the mower 100 and/or the blade motors 212 which operates the blades 212b.

As shown in FIG. 2, the navigation system 204 includes a signal detecting module 222 which detects a signal representative of a navigational marker generated by a signal generating module 221 and includes an odometry module 220, which further includes wheel sensors 232 to detect the rotational displacement of the wheels 104 of the mower 100. Each of these modules 222 and 220 are arranged to provide a specific function which are described below with reference to FIGS. 4 to 19 and return individual navigation information either detected, calculated, gathered or surveyed.

As illustrated in this embodiment, the controller 202 is also arranged to control the mower drive motors 210 to drive the mower 100 along a work surface within a work area 414. Preferably, as is the case in this embodiment, the mower 100 is driven by having a motor 210 placed adjacent to each of the rear wheels 104R with each motor 210 being arranged to drive each rear wheel 104R.

In turn, the controller 202 can direct electric current from a power source, such as a battery 214, to the motors 210 so as to perform a controlled operation of one or both motors 210. This can allow for forward, reverse and turning actions of the mower 100 by turning one or more wheels at different speeds or directions.

The controller 202 can also command the blade motor 212 to operate so as to operate the blades 212b to cut the grass of a work surface. To perform these functions, the controller 202 will execute a control routine or process 206 which determines the conditions for and when the mower 100 is to be operated. These commands at least include instructions to command the direction of travel of the mower 100 and the operation of the blades 212b. Other commands are also possible, including the command of the mower 100 to travel to a particular location within a work area 414, or to return to a specific location, such as a docking station 900 as well as specific commands such as the operating speed of the blade motor 212 or the height of the blade 212b so as to determine the level of grass that is cut.

As it will be explained below with reference to FIG. 2, the controller 202 may also be pre-programmed with an initialization routine 228 wherein the mower's working area and work surfaces are initially identified. These process may assist in identify the boundaries of a working area 414 and the categorization that certain surfaces within the boundaries should be avoided (no travel zones) or should not have the blade motor 212 activated. Once these working areas 414 are identified, the mower 100 can then be controlled by the controller 202 to navigate to a starting point from the docking station 900, wherein the mower 100 can proceed to cut the grass from the starting point as stipulated by the control algorithm 206. The control algorithm 206 may include a specific cutting program, which mows the lawn along a longitudinal axis and then work each longitudinal axis in a latitudinal form within the working area 414 defined so as to cut the grass in the working area 414. Other cutting programs are also possible and can be chosen base on the shape and profile of the working area 414 of the desired operation of a user.

Preferably, as the controller 202 will communicate with each of the navigation modules of the navigation system 204, the controller 202 may, during initialisation and general operation, receive a large amount of different navigation information from each of these navigation modules 202. In order to process this navigation information so as to determine operation commands for the mower 100, the controller 202 may first apply a filter or an averaging function to all of navigation information received from the navigation system 204.

Such a filtering function may allow the controller 202 to ignore or minimize any weighting placed on navigation information obtained from a first navigation module that appears to be incorrect when compared with navigation information obtained from other navigation modules. Example filters which can be used includes the Kalman Filter which can be applied to assist with identifying a "best fit" trend for all navigation information received by the controller and in turn, allowing anomalies, deviations or inconsistencies, which may be far away from the average or best fit trend, to be ignored or further investigated.

As an example, the controller 202 may receive navigation information from the odometry module 220. During processing, the odometry module 220 may have tracked that the mower 100 has travelled to a particular co-ordinate on a virtual map obtained during the initialization of the mower 100. However, according to the navigation information obtained by the signal detecting module 222, the location of the mower 100 may be at a distance substantially far away from the co-ordinates obtained from the odometry module 220. In these instances, when the filtering function is applied to all navigation information of the odometry module 220 and other navigation information, the "best fit" or "average" may in turn indicate that the co-ordinates of the odometry module 220 is an anomaly, as it is completely inconsistent with the other navigation modules. Accordingly, the controller 202 may then proceed to ignore this anomaly in generating commands to the mower.

It is also expected that the controller 202 may also apply a similar filtering function to all data obtained from the navigation system 204 and other sensors such as GPS sensors, compass, cliff sensors, water sensors etc. The Extended Kalman Filter, for example, may be advantageous in they are able to reduce/eliminate bad data points from each source and to assist in determining which sources of navigation/localization data are most reliable and use select these sources instead.

In some example embodiments, the filtering function or averaging function such as the Kalman Filter can also be applied by each navigation module to any navigation information obtained before the navigation information is communicated to the controller 202. In these examples, as sensors and other electronic navigation modules are arranged to obtain data from environmental readings, it is possible that due to uncontrolled incidents or other environmental factors may cause certain readings to be incorrect within a short timeframe. Examples of these may include the mower experiencing wheel spin, and thus causing erroneous readings by the odometry module 220, or signal interference by a random signal emitting source, in which case the navigation information obtained from the signal detecting module 222 may also be erroneous.

In these instances, by including a filtering function with each navigation module, such anomalies in the data collected by each navigation module may be filtered or "cleaned up" before it is sent to the controller 202. Thus this would advantageous in that the navigation information sent to the controller 202 is likely to be more accurate, resulting in improved performance and less processing by the controller 202.

Figure 3:
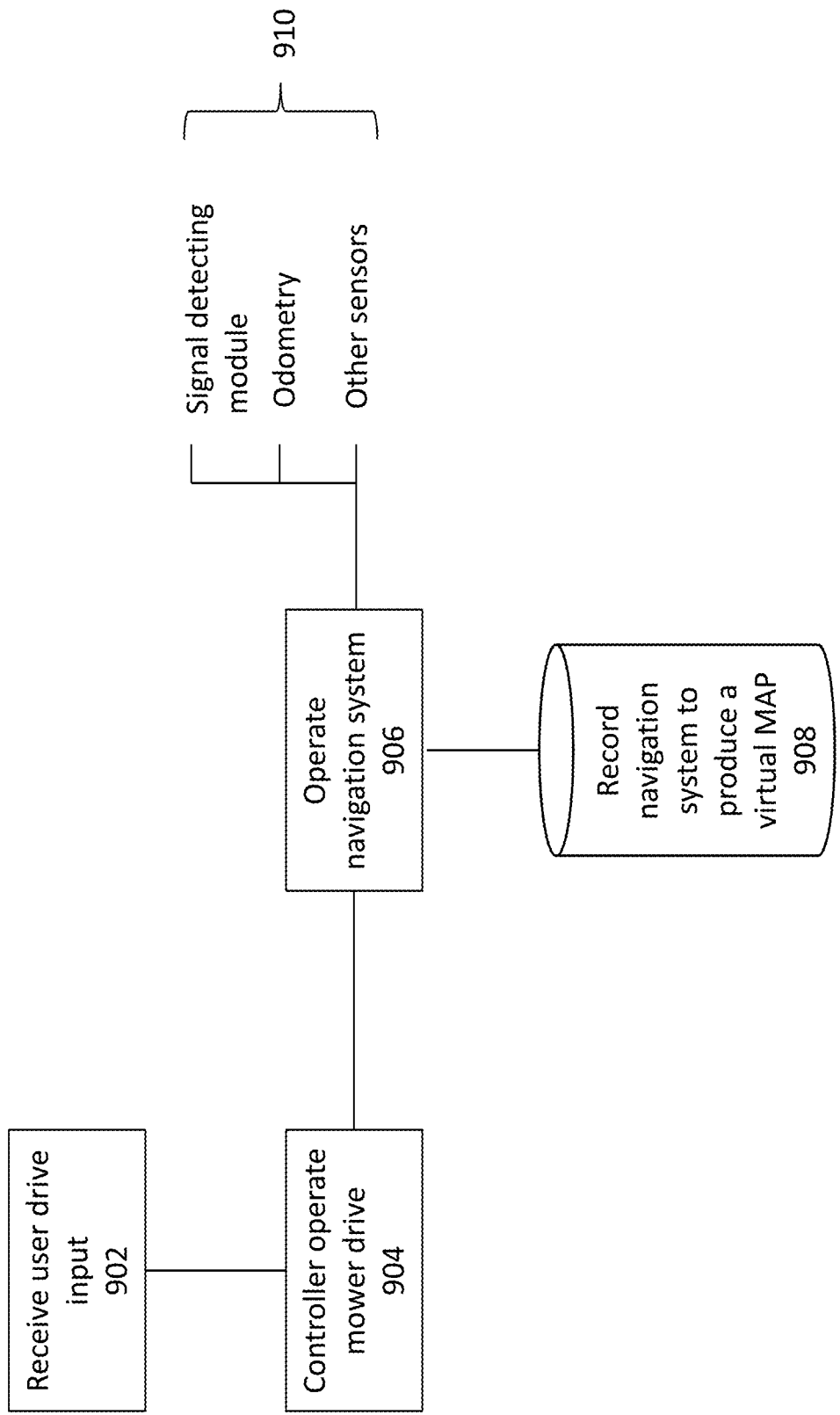
FIG. 3 is a block diagram illustrating process flow of an initialisation process for the autonomous lawn mower of FIG. 1.

With reference to FIG. 3, there is provided a block diagram illustrating the process flow of the initialization process of the autonomous mower 100. As illustrated, the user may start to issue commands to the mower 100 to drive the mower 100. These commands are received (step 902) and processed by the controller 202 so as to drive the mower 100 along a surface (step 904).

Meanwhile, the navigation system 204 is operated (step 906) so as continuously survey and records any navigation information for the mower 100 during its initialization process. The navigation system 204 may then active each of its navigation modules 910 (Odometry and other sensors) to record such navigation information (step 908) which can be used for navigation purposes when the mower 100 is put into autonomous operation.

Figure 4:
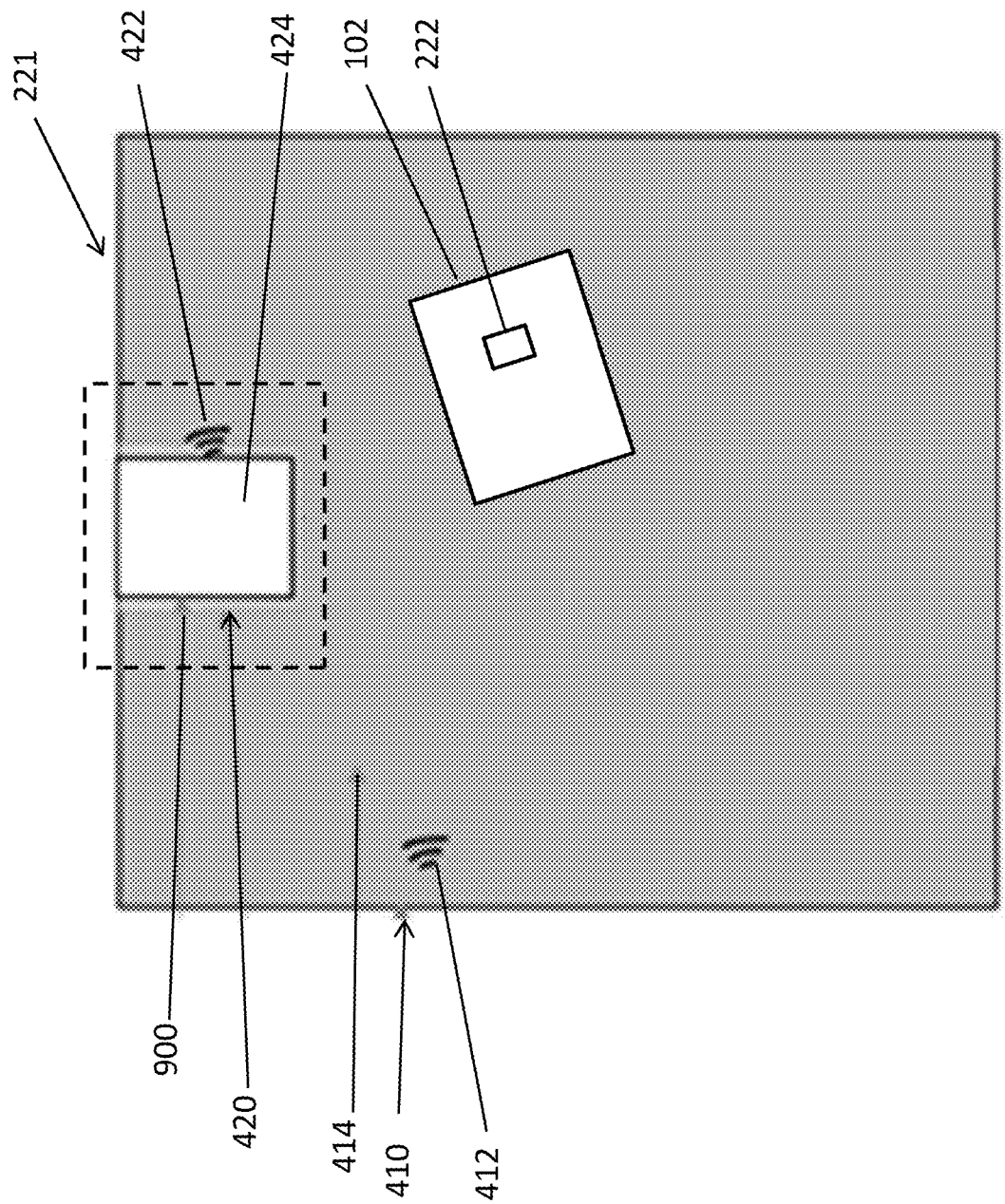
FIG. 4 is a diagram showing the boundary wire loop and the docking wire loop of the autonomous lawn mower of FIG. 1.
Figure 5:
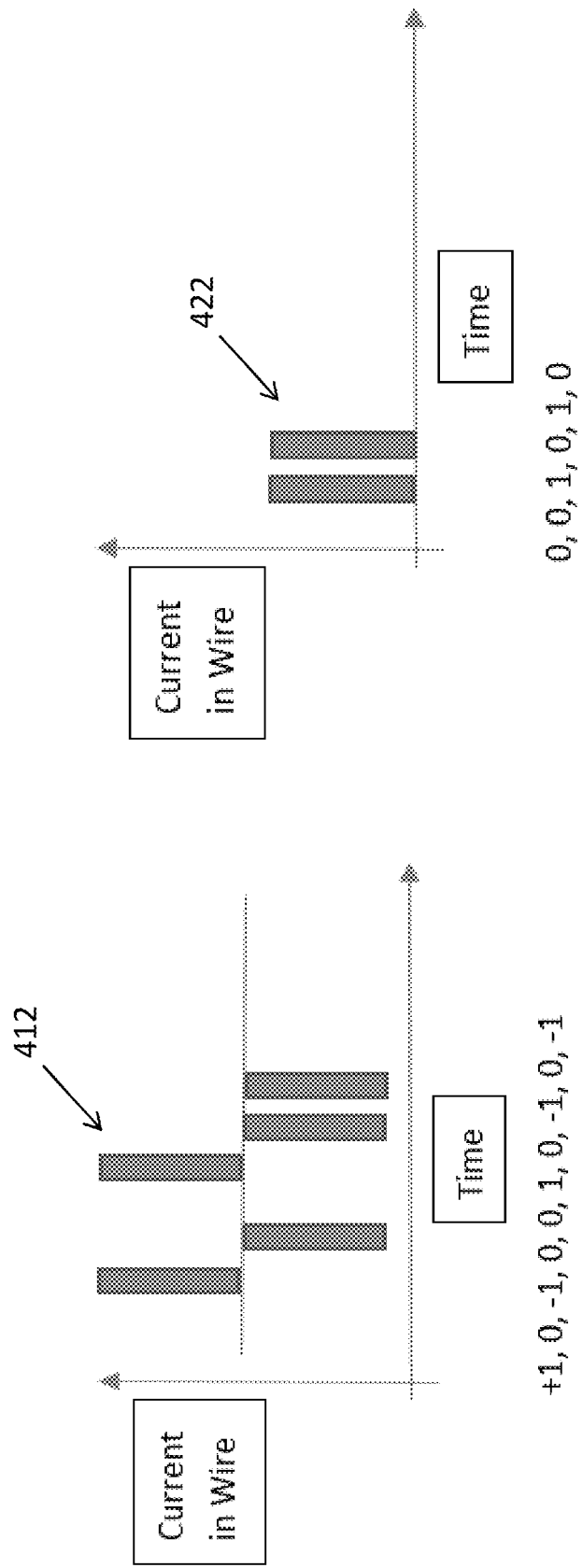
FIG. 5A is a diagram showing signals transmitted from the docking station to the boundary wire loop.
FIG. 5B is a diagram showing signals transmitted from the docking station to the docking wire loop.

With reference to FIG. 4, there is illustrated a signal generating module 221 arranged to generate a signal, preferably in the form of a loop, representative of a navigational marker including the location of an obstacle or boundary 410, 420. On the other hand, the mower body 102 includes a signal detecting module 222 e.g. a sensor arranged to detect the signal representative of such navigational marker. The navigation system 204 determines a position of the mower body 102 within a predefined operating area 414 based on the location of such obstacle or boundary.

The signal generating module 221 may generate a plurality of signal loops with different magnitude such that the signal may only be detected within a particular range or area. For instance, the signal generating module 221 may include a boundary wire 410 for generating a first, boundary signal loop 412 within the predefined operating area 414. The position of the mower body 102 relative to the predefined operating area 414 is determined by the controller 202 based on the magnitude of the first signal loop 412 detected by the sensor 222. Preferably, the boundary signal loop 412 is emitted about the boundary of the predefined operating area 414.

In one further embodiment, the signal generating module 221 is at least partially positioned on a detachable docking module 900 detachably receiving the mower body 102. The detachable docking module 900 may include a docking wire 420 for generating a second, docking signal loop 422 within a predefined docking area 424 about the detachable docking module 900. The position of the mower body 102 relative to the detachable docking module 900 within the predefined docking area 424 is determined by the controller 202 based on the magnitude of the second signal loop 422 detected by the sensor 222.

Figure 6:
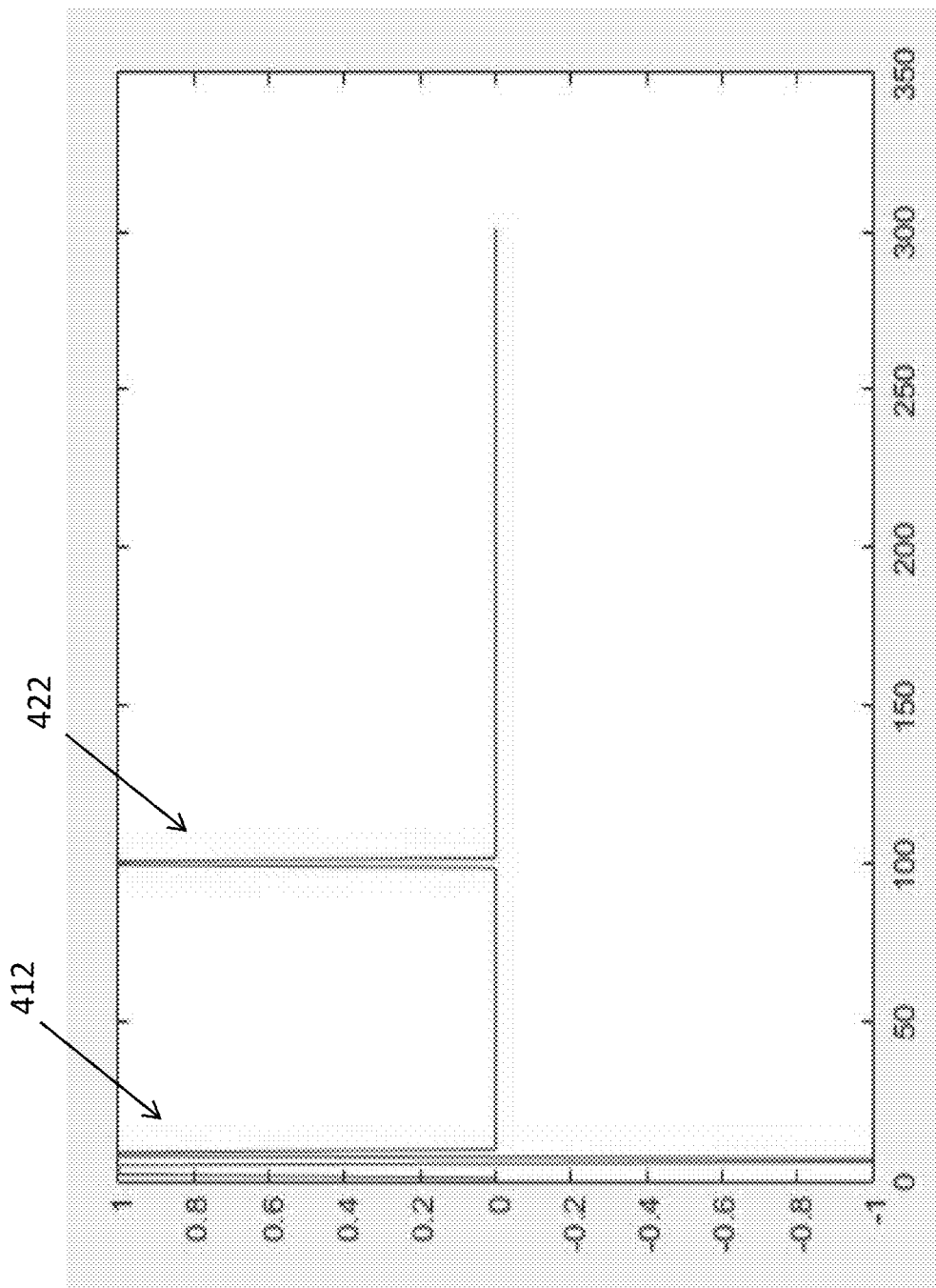
FIG. 6 is a diagram showing an example signal received by the sensor of the autonomous lawn mower.
Figure 7:
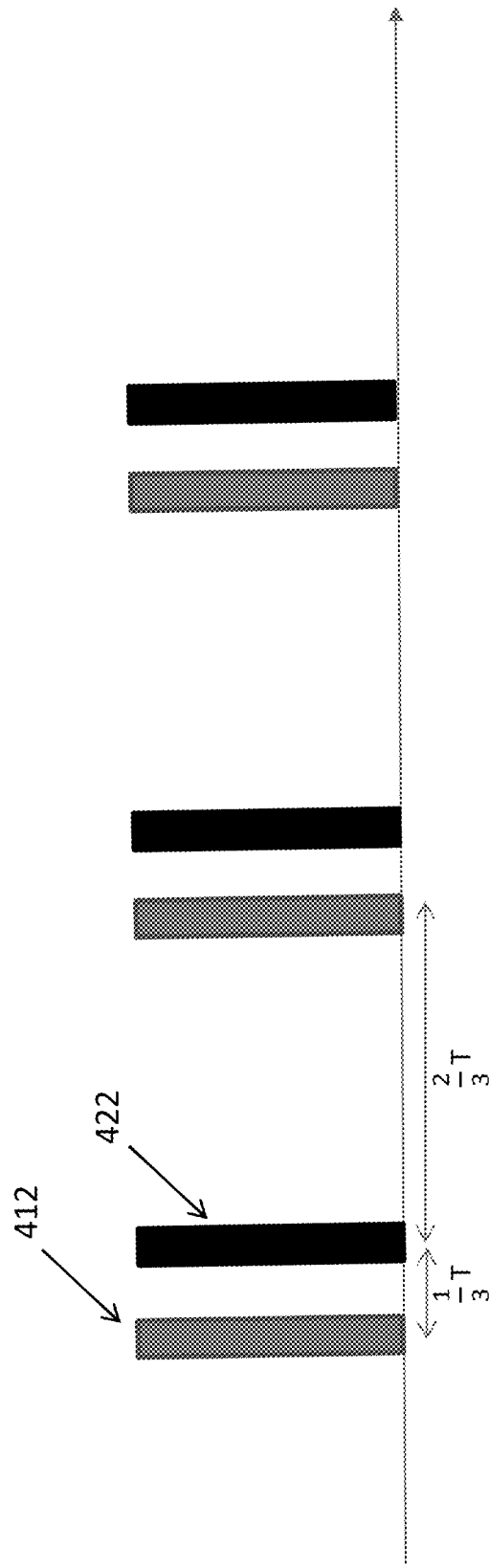
FIG. 7 is a diagram showing time shift between the boundary signal and the docking signal.

The first and second signal loops 412, 422 may be emitted by the same signal generating module 221 to the boundary wire 410 and the docking wire 420 as pulses with the same frequency e.g. 15 Hz at the same frequency e.g. 53 Hz respectively. Preferably, the first signal loop 412 may include a bidirectional current pulse with an example pattern of 1, 1, −1, 1 as depicted in FIG. 5A. The second signal loop 422 may include a unidirectional current pulse with an example pattern of 0, 0, 1, 0, 1, 0 as depicted in FIG. 5B. The combination of the two current pulses, as depicted in FIG. 6, are transmitted from the signal generating module 221 to the boundary wire 410 and the docking wire 420 respectively.

Advantageously, the docking station 900 may determine the length of the boundary wire 410 and calibrate at start-up to adjust the signal strength based on the wire length. This ensures that the signal is emitted by the signal generating module 221 at constant signal strength, regardless the dimension of the boundary wire 410.

In one example application, the sensor 222 receives the first and second signal loops 412 and 422 when the mower body 102 is at a position inside the predefined operating area 414 as well as the predefined docking area 424. To allow the sensor 222 to distinguish between the signals 412, 422 emitted by the boundary wire 410 and the docking wire 420 at the same frequency thereby identify each of the two signal loops individually and in turn determine the magnitude thereof respectively, the signals 412, 422 are emitted as two time shifted pulses spaced by e.g. (⅓)*T therebetween. The time difference between the two signals 412, 422 may be manipulated to identify each of the boundary and docking signals 412, 422 on the sensor 222 side.

Figure 8:
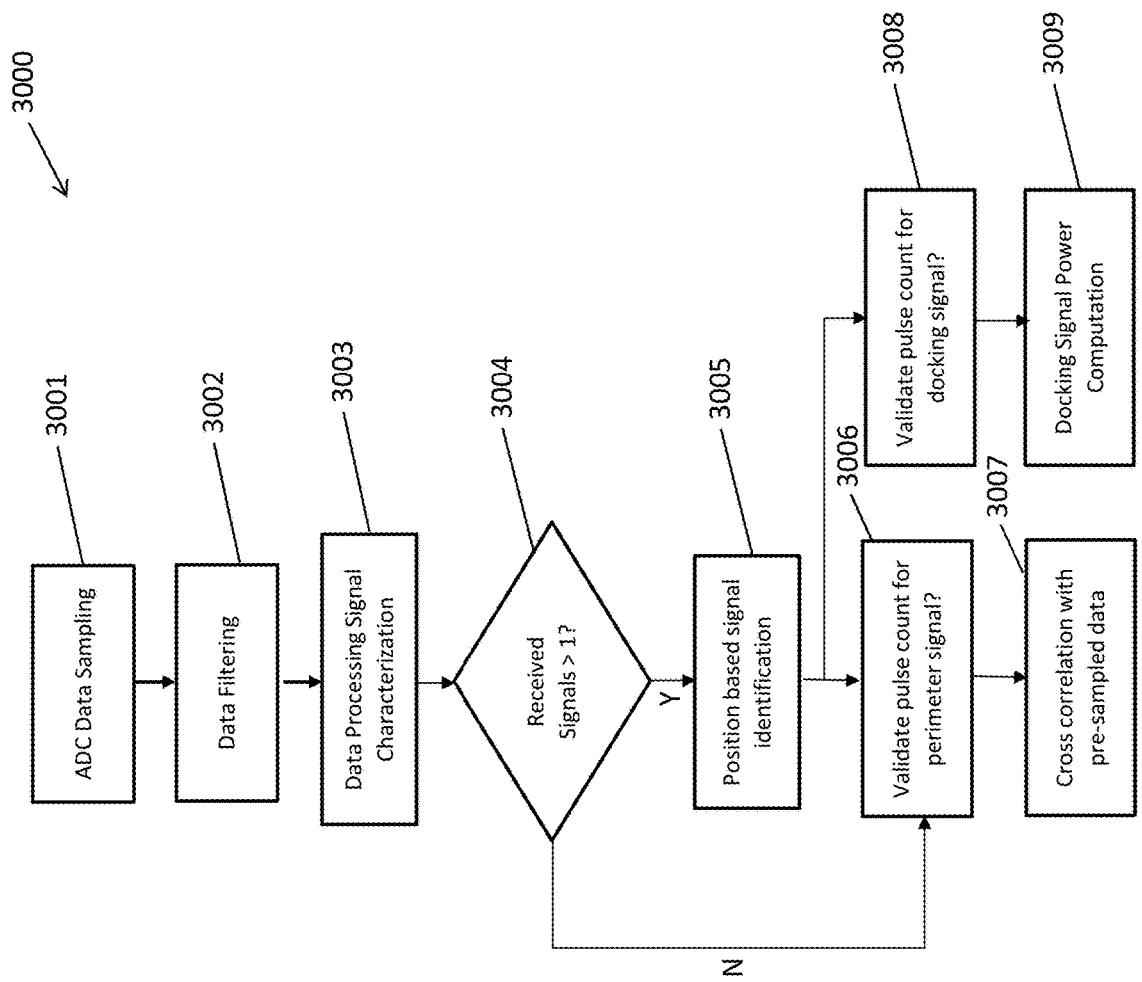
FIG. 8 is a block diagram illustrating an example induction sensor data acquisition algorithm of the autonomous lawn mower of FIG. 1.
Figure 9:
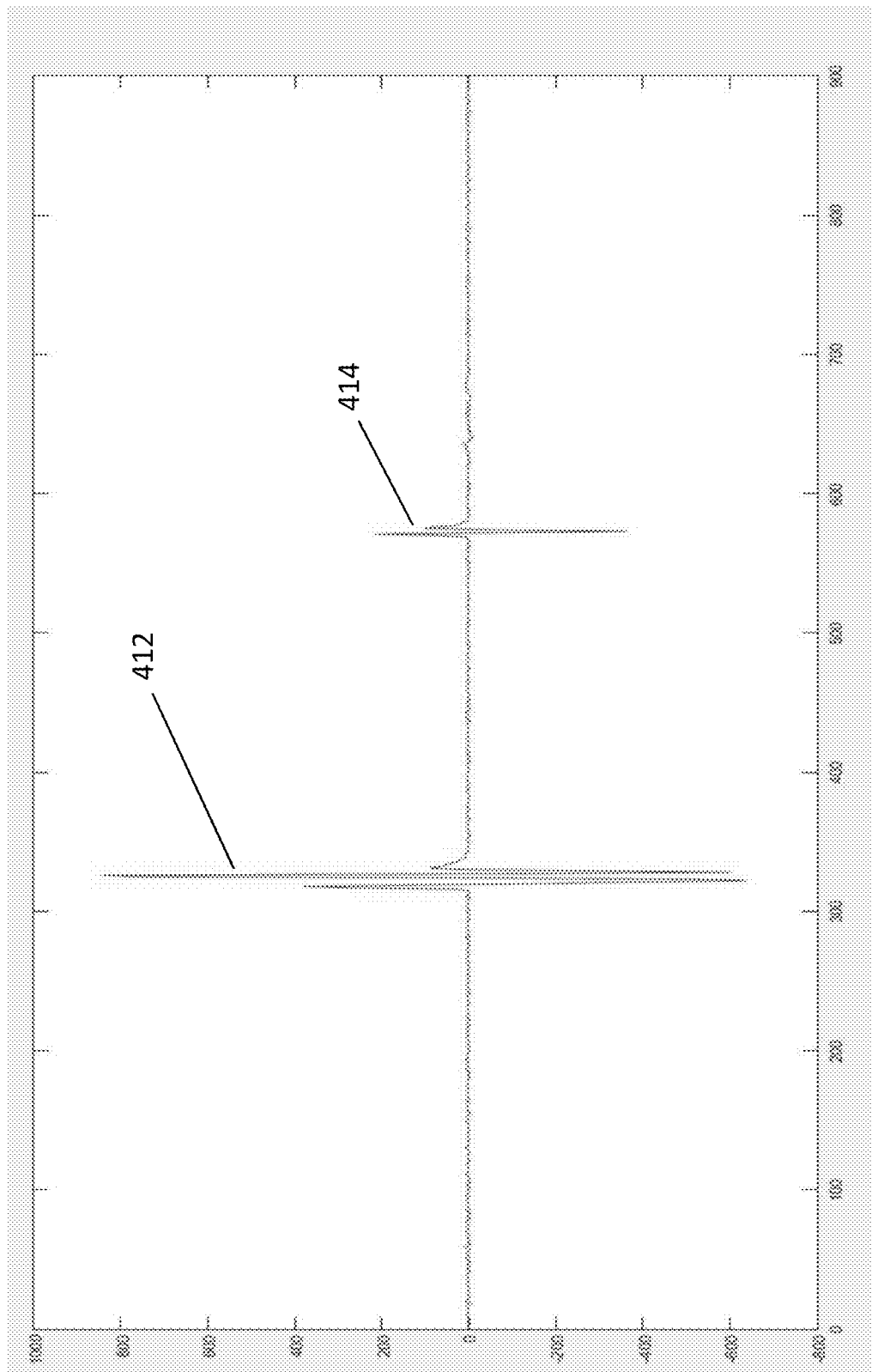
FIG. 9 is a diagram showing a sampled ADC data of the autonomous lawn mower of FIG. 1.

With reference to FIG. 8, there is also provided an induction sensor data acquisition algorithm 3000 for processing the data associated with the signals 412, 422 received by the sensor 222. The process begins at step 3001 with ADC Data Sampling. ADC channel is sampled for a time span enough to capture sampled ADC data including at least two complete boundary loop signal 412 and docking loop signal 422 as shown partially in FIG. 9. At step 3002 of Data Filtering, a biquad band bass filter is used to filter noisy data.

At step 3003 of Data Processing and Signal Characterization, received data is processed to retrieve information associated with number of signals in acquired data, each signal position (start point) in sampled array, pulse count in each signal, and maximum and minimum value of each signal.

At step 3004, the data acquisition may proceed to different steps depending on the amount of signal received. For instance, if more than one signal is received in the sampled array, this implies the sensor 222 of the mower body 102 is positioned within the operating area 414 as well as the docking area 424. The process is then proceeded to step 3005 for position based signal identification. The time difference between the start points of signals 412, 422 would be used to identify each of the boundary loop signal 412 and the docking loop signal 422.

Figure 10B:
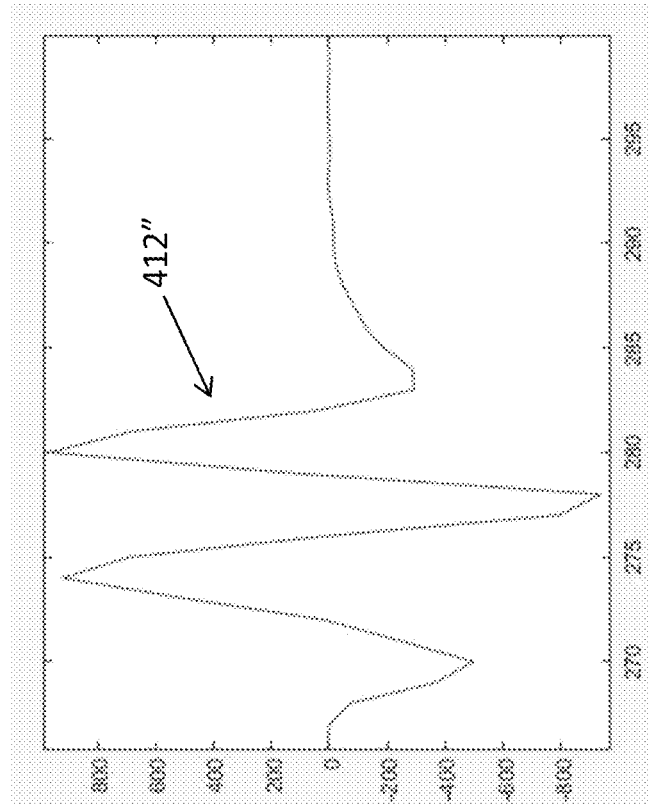
FIG. 10B is a diagram showing signal with negative polarity detected by the sensor of the autonomous lawn mower of FIG. 1.
Figure 10A:
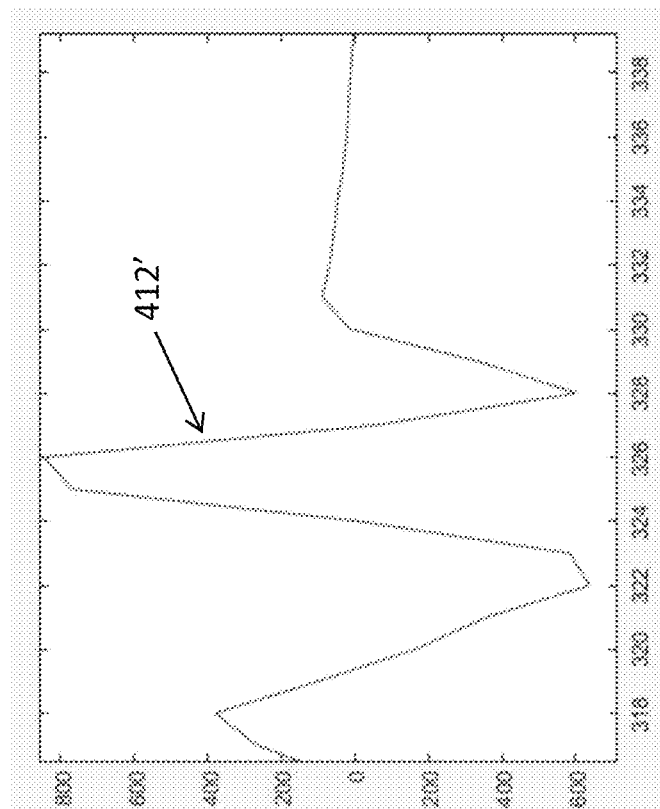
FIG. 10A is a diagram showing signal with positive polarity detected by the sensor of the autonomous lawn mower of FIG. 1.

Upon the completion of data processing, signal characterization and identification of steps 3003 to 3004, the only remaining signal would be the signal 412 of the boundary loop 410, as depicted in FIG. 10A or 10B.

The pulse count for boundary signal 412 is validated at step 3006. A pre-sampled data for boundary loop 412 is stored in memory. The received signal is cross-correlated with pre-sampled data e.g. a known signal at a specific distance to arrive final output data at step 3007. Preferably, the cross-correlation may include the use of matched filter.

For instance, the cross-correlation may result in a negative value output when the matched filter is applied to the received signal which is opposite in polarity with presampled data. The sign of the matched filter output may indicate whether the sensor 222 of the mower body 102 is positioned inside or outside the boundary loop 410.

Meanwhile, the pulse count for docking signal 424 is also validated at step 3008, and the docking signal power is computed at step 3009.

Preferably, the sensor 222 may only receive the pulse 412 of the boundary loop 410 when the mower body 102 is at a position inside the predefined operating area 414 whilst outside the predefined docking area 424. Upon detecting the pulse 412 of the boundary loop 410 with a magnitude exceeding a predetermined threshold by the sensor 222, the movement of the lawn mower 100 would be significantly reduced, thereby preventing the lawn mower 100 from winding the boundary wire 410.

In one example embodiment, the sensor 222 may detect whether the mower body 102 is positioned within the boundary wire 410 or outside the boundary wire 410 based on the polarity of the boundary loop signal 412. For instance, the sensor 222 may detect a first polarity of the boundary signal loop 412' e.g. a positive polarity, as depicted in FIG. 10A, when the mower body 102 is at a position inside the predefined operating area 414. In contrast, the sensor 222 may detect a second opposite polarity of the boundary signal loop 412" e.g. a negative polarity, as depicted in FIG. 10B, when the mower body 102 is at a position outside the predefined operating area 414.

If only one signal is received in the sampled array, this implies the sensor 222 of the mower body 102 is not proximate to the docking loop 422 and thus only signal 412 from the boundary loop 410 is received. Before further processing, certain conditions are checked for verification. If the only signal received by the sensor 222 is verified to be the boundary loop 410, the process will bypass step 3005 and directly proceed to step 3006 for validating the pulse count for boundary signal 412 and step 3007 for cross correlating with the pre-sampled data.

Figure 12:
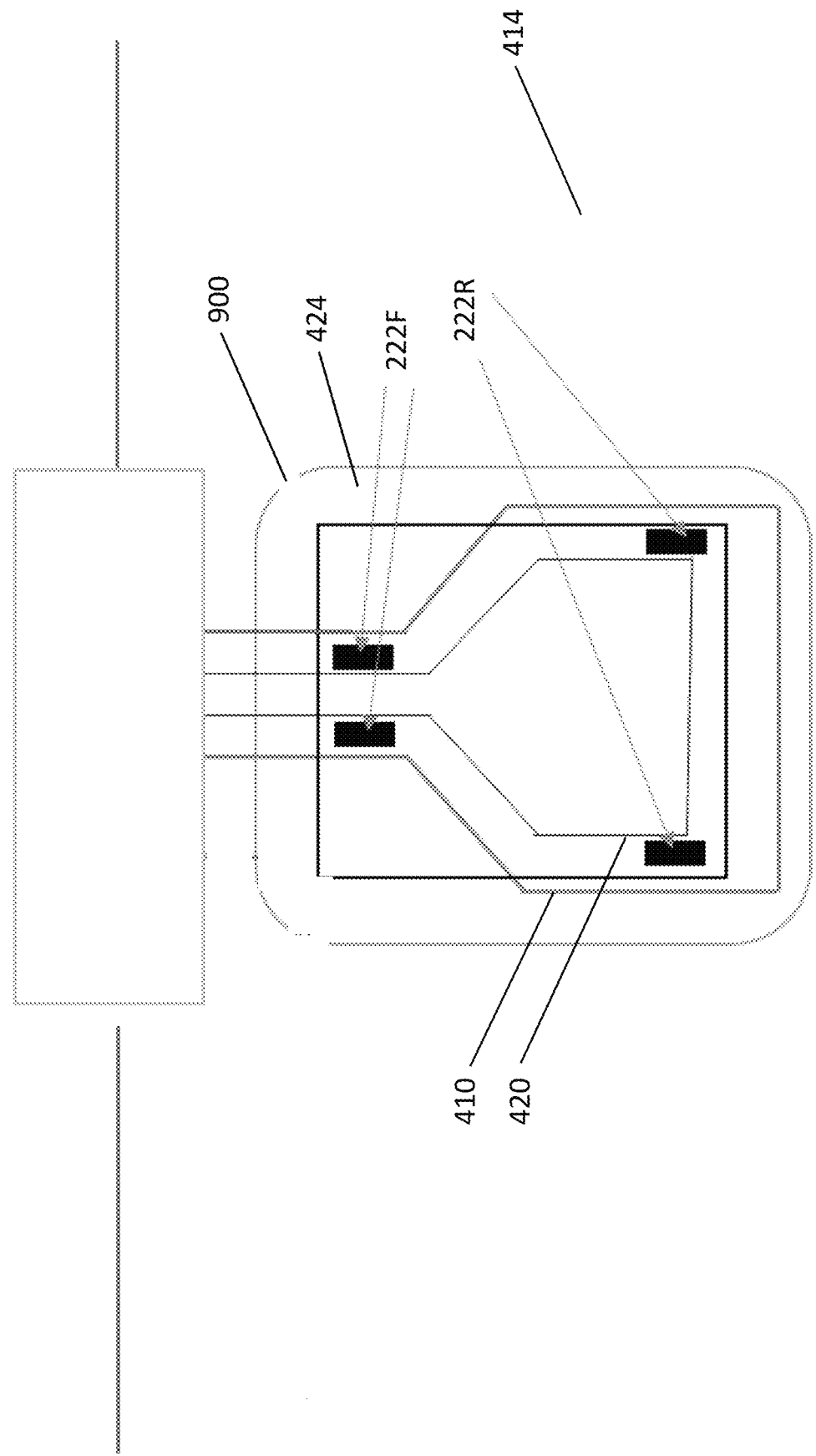
FIG. 12 is a diagram showing the pairs of sensors sandwiched between the boundary wire loop and the docking wire loop of FIG. 11.

With reference to FIGS. 11 to 12, the mower body 102 may include a plurality of aforesaid sensors 222 e.g. two pairs of front and rear sensors 222F, 222R, whereby the controller 202 terminates the movement of the mower body 102 upon all the front and rear sensors 222F, 222R are sandwiched between the boundary signal loop 412 and the docking signal loop 422. For instance, the sensors 222F, 222R are placed inside the docking station 900 for accurate docking. The sensors 222F, 222R and the two loops i.e. boundary loop 412 and docking loop 444 within the docking station 900 are placed in such a fashion that when the lawn mower 100 is parked in the docking station 900, each of the sensors 222F, 222R is outside the docking loop 420 whilst inside the boundary loop 410.

The detachable docking module 900 also includes a magnetic detection module e.g. magnetomer for detecting the orientation of the mower body 102 with respect to the detachable docking module 900.

During initial step up of the lawn mower 100, the docking station 900 is secured in ground and a calibration process is performed prior to normal operation of the lawn mower 100 by the user. This calibration records the heading of the docking station 900 i.e. yaw position. Such information would be used in subsequent docking cycles for docking operation. The yaw position of the docking station 900 may be recalibrated by going through the same calibration process when necessary.

Figure 13:
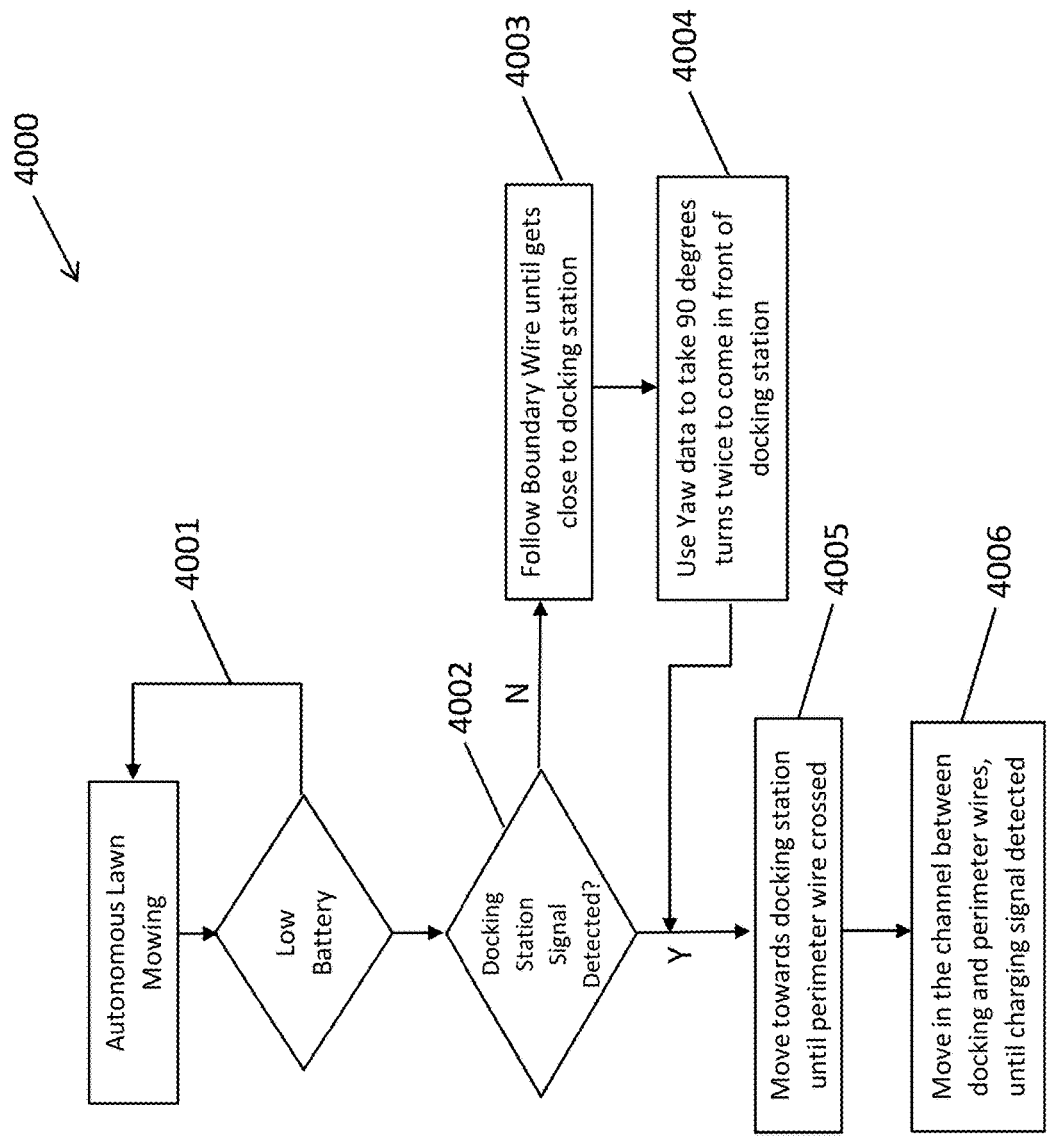
FIG. 13 is a block diagram illustrating a method of operating the autonomous lawn mower of FIG. 1.
Figure 14:
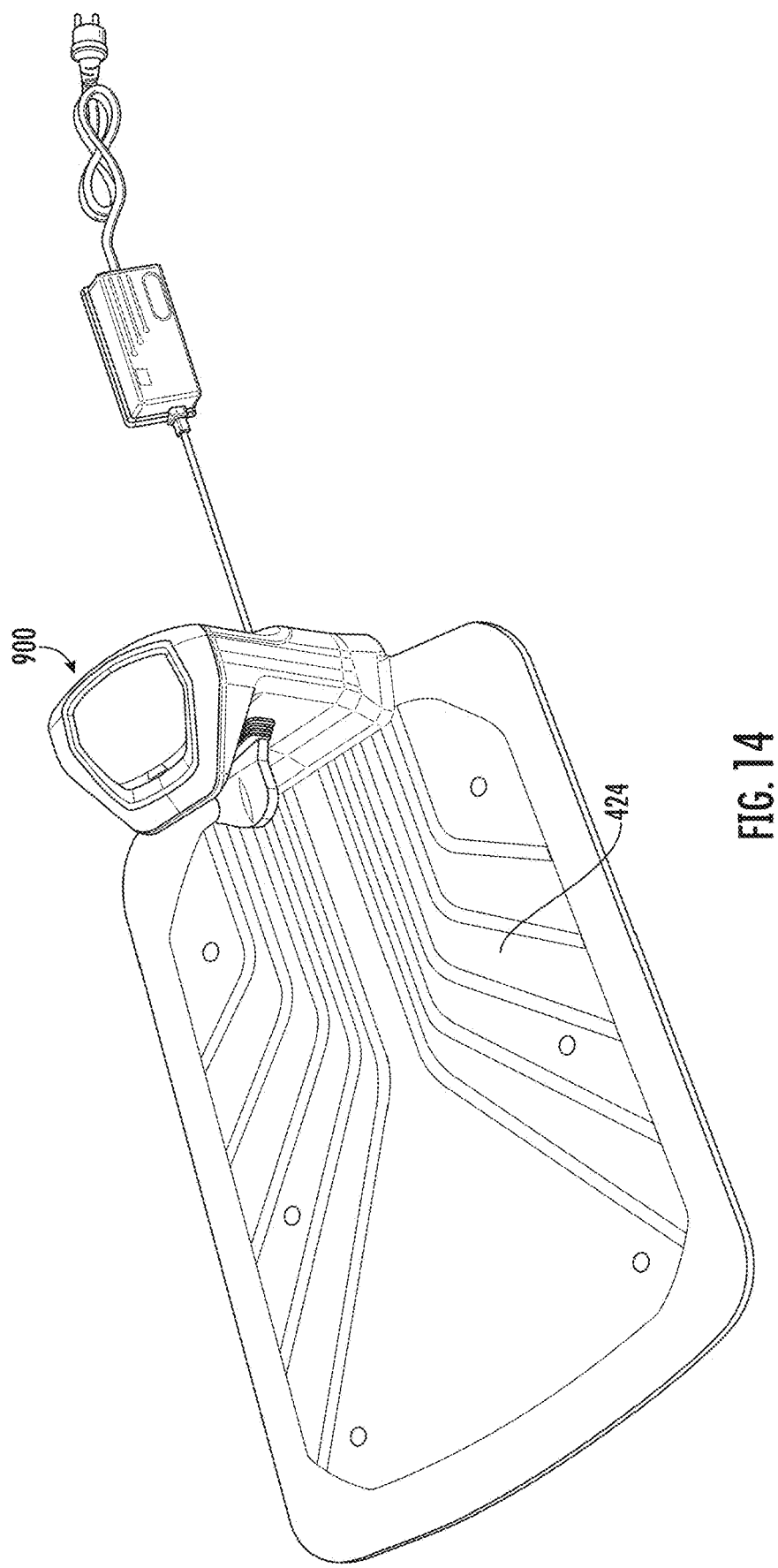
FIG. 14 is a diagram showing the docking station of the autonomous lawn mower of FIG. 1.
Figure 15:
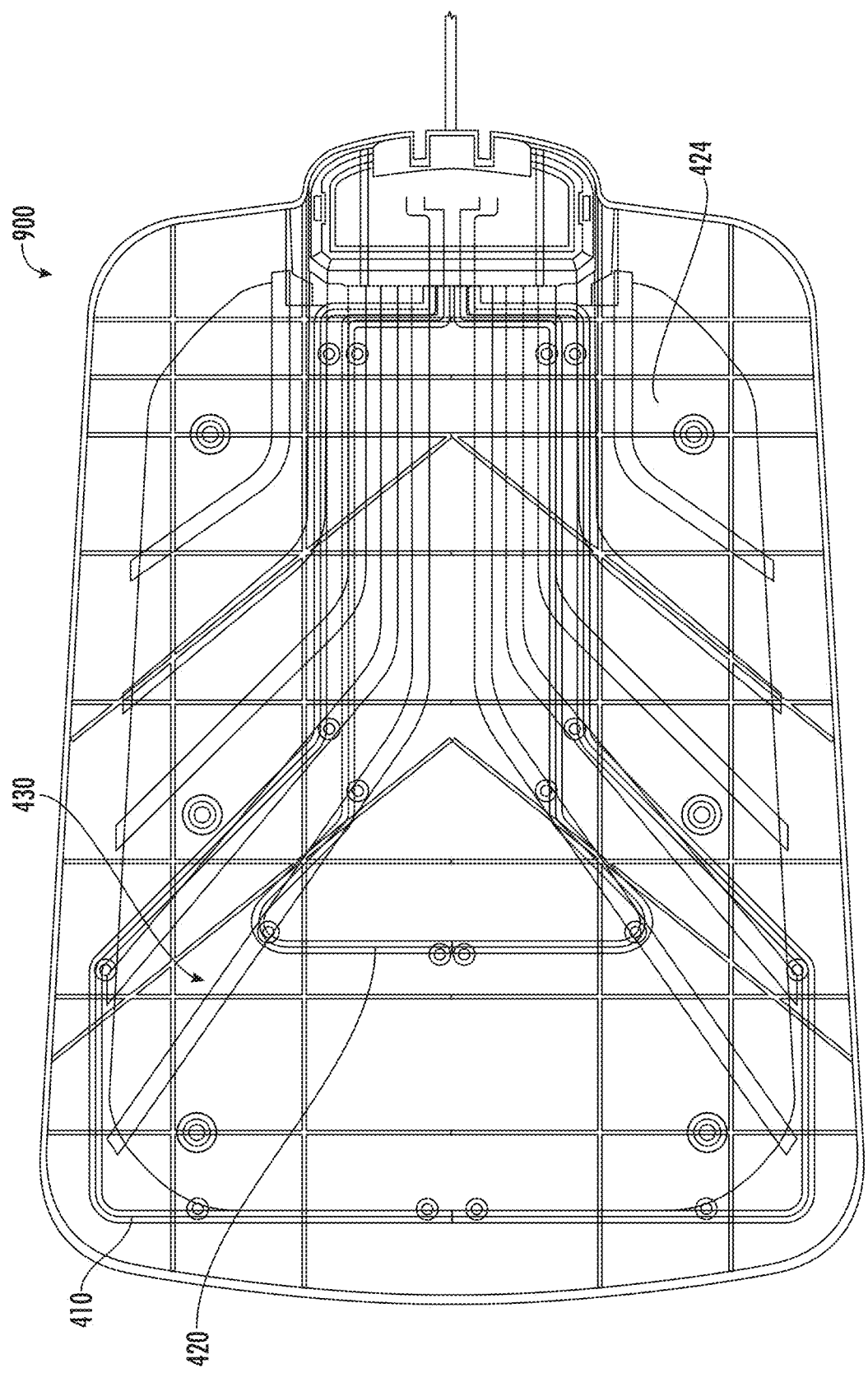
FIG. 15 is a diagram showing the docking station of FIG. 14, with the boundary wire loop and the docking wire loop.

With reference to FIG. 13, there is also provided a method 4000 of operating the autonomous lawn mower 100. The autonomous lawn mower 100 may be operated normally for automated lawn mowing, for example in a random cutting mode, until the battery charge is low. Upon the battery drops below a predefined threshold or receives a docking signal/instruction from the detachable docking module 900 at step 4001, the autonomous lawn mower returns to the detachable docking module for battery charging.

For instance, during the cutting operation, the lawn mower 100 moves around the operating area 414 in a random manner and the sensors 222 attempt to detect the docking station signal at step 4002.

In a first scenario, the lawn mower 100 is positioned remote from the docking station 900 and the sensor 222 yet to detect the docking station signal 422. At step 4003, the mower body 102 follows the boundary wire 410 until it is proximate to the docking station 900. The presence of docking station 900 at any point is determined based on the power level of received docking wire signal 412 by the sensors 222. For instance, this may be achieved by receiving docking wire signal 412 with a power higher than a predefined threshold.

At step 4004, the lawn mower 100 is proximate to the docking station 900 and the controller 202 uses area sensors data along with yaw data to align itself with the docking station 900, for example, by taking one or more turns e.g. turning at 90° twice to come in front of docking station 900. Upon orienting the lawn mower 100 to the docking station 900, the mower body 102 then moves towards docking station 900 until the boundary wire 410 is crossed by the pair of front sensors 222F at step 4005. Finally, the mower body 102 moves in a channel 430 formed between the boundary and docking wires 410, 420 as depicted in FIG. 11, and continue until a charging signal is detected by the docking station 900 at step 4006.

In a second scenario, the lawn mower 100 is already proximate to the docking station 900 and the sensors 222F, 222R has already detected the docking station signal 422 at step 4002. Without taking steps 4003 to 4004, the mower body 102 will move towards the docking station 900 in a forward direction in a straight line based on yaw orientation of docking station 900 with respect to the lawn mower 100 and continues until the boundary wire 410 is first crossed by the pair of front sensors 222F and the two pairs of front and rear sensors 222F, 222R move in the channel 430 between the boundary and docking wires 410, 420 from steps 4005 to 4006.

Figure 16:
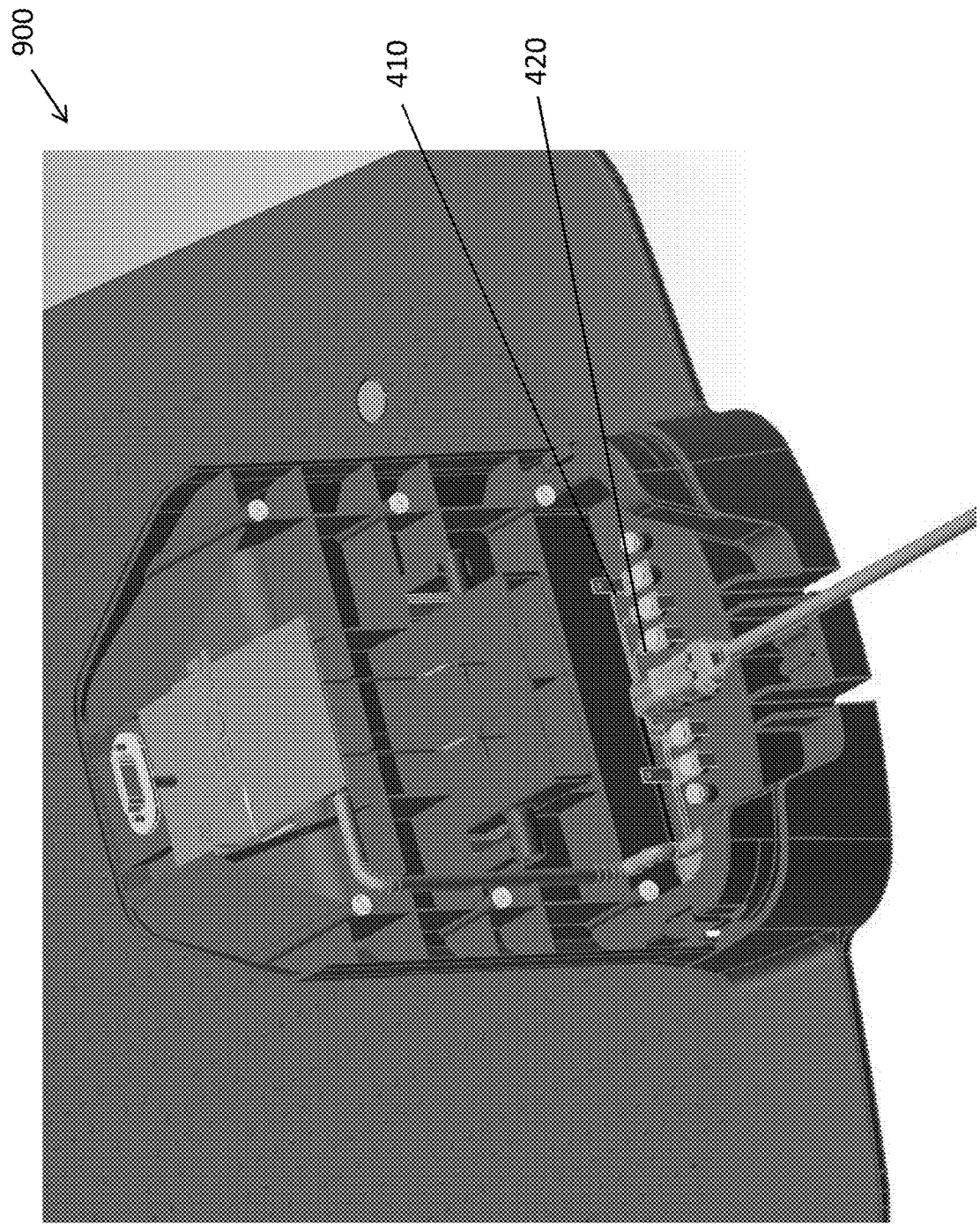
FIG. 16 is a diagram showing part of the docking station of FIG. 14.
Figure 16A:
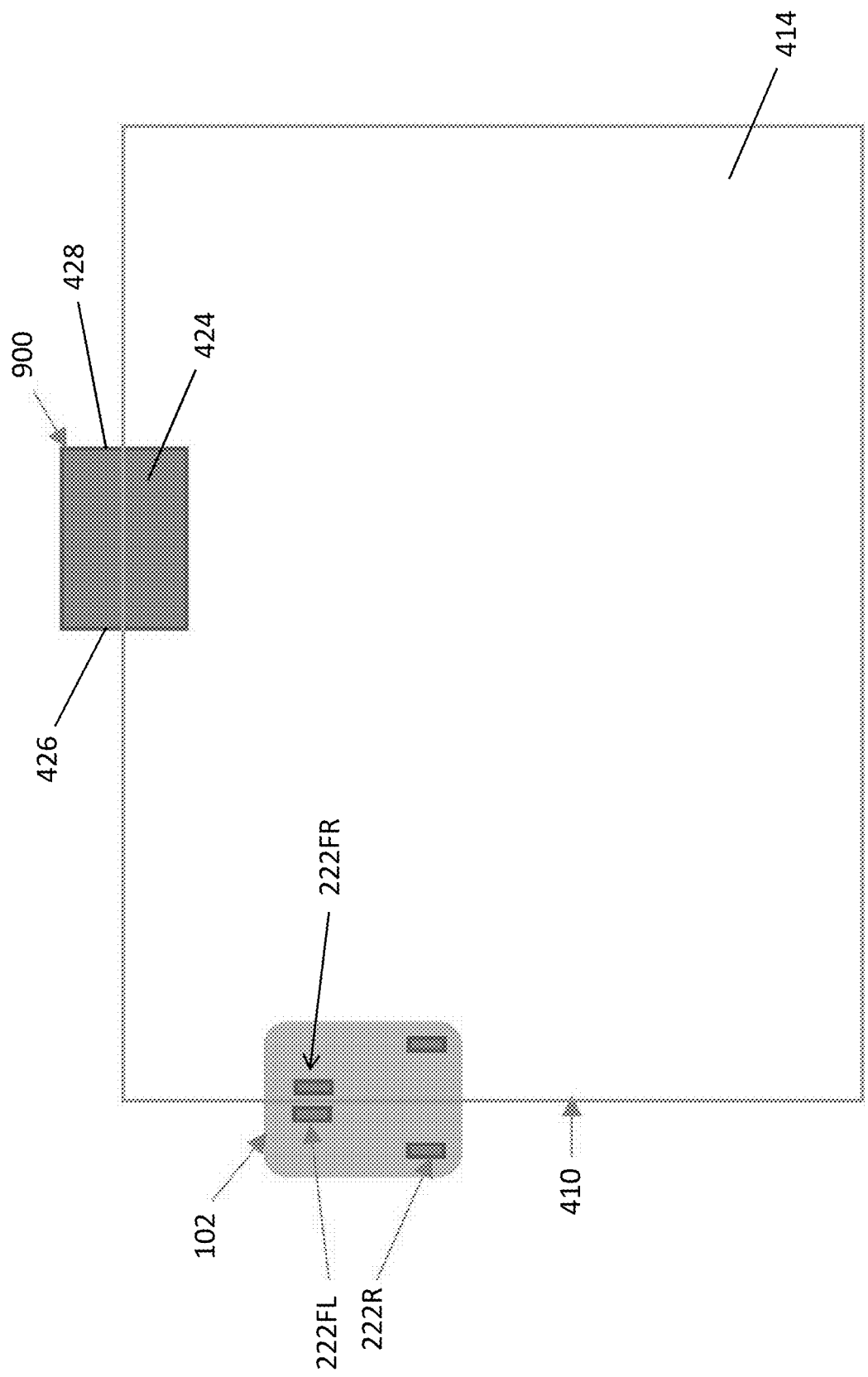
FIG. 16A is a schematic diagram illustrating a method of docking the autonomous lawn mower of FIG. 1.

With reference to FIG. 16A, there is provided an alternative docking method for in-line docking the autonomous lawn mower 100 to the aforementioned predefined docking area 424 along the aforementioned boundary wire 410. For instance, the predefined docking area 424 may be located about the boundary of the predefined operating area 414 and overlap at least a portion of the boundary wire 410.

In one example embodiment, the boundary wire 410 may bisect the predefined docking area 424 in a longitudinal direction, such that the boundary wire 410 may overlap the centre line of the predefined docking area 424. The mower body 102 may enter the docking area 424 from one end 426 of the predefined docking area 424 along the centre line and until the front mower body 102 reaches the further end 428 of the predefined docking area 424. Accordingly, the mower body 102 may dock accurately within the predefined docking area 424 once the centre of the mower body 102 is in line with the boundary wire 410 in the early stage of the docking operation.

Preferably, the mower body 102 may move towards and dock within the docking area 424 with the aiding of only single boundary wire 410. Throughout the in-line docking operation, two, left and right front sensors 222FL and 222FR on the mower body 102 are each positioned on two opposite sides of the boundary wire 410 and each receives the boundary signal 412 emitted from the boundary wire 410 respectively. The left and right front sensors 222FL should receive boundary signal 412 in opposite polarity. For instance, the left front sensor 222FL may receive the boundary signal 412 with a first, negative polarity and the right front sensor 222FR may receive the boundary signal 412 with a second, positive polarity.

To maintain the spacing between each of the two front sensors 222FL and 222FR and the boundary wire 410 individually, the autonomous lawn mower 100 may further include a controller e.g. a closed loop controller for detecting the individual spacing of the front sensors 222FL and 222FR from the boundary wire 410. For instance, the magnitude of the boundary signal 412 may be detected by the front sensors 222FL and 222FR respectively and the individual spacing between the sensors 222FL and 222FR and the boundary wire 410 may be determined based on the detected magnitude. Subsequently, the position of the mower body 102 relative to the boundary wire 410 may be determined by the controller based on the relative positions of the sensors 222FL and 222FR. In general, the left and right front sensors 222FL and 222FR should receive equal magnitude of signal loop 412 with opposite polarity from the boundary wire 410 respectively when the mower body 102 is bisected by the boundary wire 410 i.e. the centre of the mower body 102 is in line with the boundary wire 410.

During the continuous docking operation, the controller may manipulate the movement and orientation of the mower body 102 based on the real-time positioning feedback from the two front sensors 222FL and 222FR. This ensures that the mower body 102, on its way to the docking area 424, may be positioned in a desirable orientation and travel in a path overlapping the boundary wire 410 to reach the predefined docking area 424.

Optionally, there may also be provided an additional pair of rear sensors 222R on the rear end of the mower body 102 for determining the magnitude of the boundary signal 412 in a similar manner. The accuracy of the position and orientation of the mower body 102 determined by the controller may be improved.

In one alternative example embodiment as shown in FIG. 16B, there is shown a docking module 900 having part of the boundary wire 410 and an auxiliary docking wire 420 provided within a predefined docking area 424 in the detachable docking module 900. The auxiliary docking wire 420 emits a boundary signal 422 for assisting the docking operation of the mower 100, especially when the mower 100 proximate to the docking module 900. Preferably, the auxiliary docking wire 420 is bisected by at least a portion of the boundary wire 410.

Upon the mower 100 enters the docking area 424 from one end 426 of the predefined docking area 424 along the centre line, the front sensors 222FL and 222FR may detect two, a boundary signal 412 and a docking signal 422. The magnitudes of these signals, especially the docking signal 422 may be detected by the front sensors 222FL and 222FR respectively. The individual spacing between the sensors 222FL and 222FR and the adjacent portions of the docking wire 420 may be determined based on the detected magnitude. Subsequently, the position of the mower body 102 relative to the docking wire 420 may be determined by the controller based on the relative positions of the sensors 222FL and 222FR.

If the mower 100 reaches the final docking position, the left and right front sensors 222FL and 222FR should receive equal magnitude of signal loop 412 with opposite polarity as well as equal magnitude of signal loop 422. This indicates that the left and right front sensors 222FL and 222FR are positioned outside and about the docking wire 420 whilst one of the front sensors 222FL and 222FR remains inside the boundary loop 410.

With reference to FIG. 17, there is illustrated an example of an odometry module 220 arranged to be implemented with an autonomous mower 100. In this example embodiment, the odometry module 220 is arranged to be implemented into each of two motors arranged to drive the rear wheels 104R of the mower 100, although as a person skilled in the art would appreciate, if additional motors are used to drive other wheels of the mower 100, than this odometry module 220 can also be implemented into each of the motor windings 302.

In this example, the odometry module 202 is arranged to measure the number of rotations of the wheels 104R to which the odometry module 202 is implemented to operate with. In turn, the number of rotations, when coupled with the circumference of the wheel 104R will provide an estimation as to the distance travelled by the mower 100 on a work surface (taking into account any gear ratios, if applicable). As the mower 100 may also turn along its work surface by allowing its opposing wheels to spin in opposite directions, such movements and rotation can also be detected and measured so as to determine the direction and rate of turn of the mower 100 along a work surface.

As illustrated in FIG. 17, the odometry module 202 is implemented onto a motor 302 and gearbox arrangement 304 which drives one of the rear wheels 104R, with each rear wheel 104R having its own motor 302 and gearbox 304. When the motor 302 is energised by its power source, in most instances by command of the controller 202, the motor will rotate 302 and thus also driving a gearbox 304 which is rotatably attached to the motor 302.

The gearbox 304 will then also transmit this rotational force to the wheels 104R and thus turning the wheels 104R in a desired direction. As the gearbox ratio is known, either by presetting at the factory, or user adjustment, the odometry module 202 can thus operate by detecting the number of rotation of the motor 302 which can in turn be used to calculate the number of rotations of the wheel 104R.

In this implementation, the motor has a Print Circuit Board (PCB) 306 connected to the motor windings 302 and rotor which is implemented with a number of hall sensors 308. These hall sensors 308 allow a magnetic signal to be detected upon each sensor 308 being rotated passed a magnet (or have a magnet rotated pass the sensor 308) and thus when the motor is rotated, the PCB 306, which is static, will detect the magnets held in the rotor of the motor 302. The hall sensors 308 located on the PCB 306 can thus detect a magnet as it is passed during the rotation of the motor windings 302. In turn, this data from the hall sensors 308 can then be used to calculate the number of or portions of rotations of the motor 302, which can then be used to calculate the number of rotations of the wheel 104R via the gearbox 304.

Once the number of rotations is determined, the number of rotations of each wheel 104R, including its direction and whether the wheels 10R are undergoing a turning direction, will then be transmitted to the controller 202 for processing. In turn, the controller 202 can then process this result with other information from the navigation system 204 to ascertain the location of the mower 100.

It is expected that the wheels of the mower 100 may undergo some wheel spin when the mower 100 is in operation, as the surface type may cause the wheels 104R to spin without moving the mower 100. Such wheel spins will result in error when determining the position of the mower 100. However, such errors are factored into the calculation by the controller 202 as other navigation information obtained by other modules of the navigation system 204 will be used to compensate for any errors of one individual navigation module.

In another example implementation, the amount of electric current drawn by the motor 302 may also be measured and compared against the rotation rate detected by the odometry module 202. In such examples, if the current drawn by the motor 302 is very low relative to the number of rotations detected of the wheel 104R, then the wheels 104R of the mower 100 may indeed be spinning along its working surface. Accordingly, such information may also be considered by the controller 202 in determining the distance of the mower 100 based on its odometry measurement.

Figure 18:
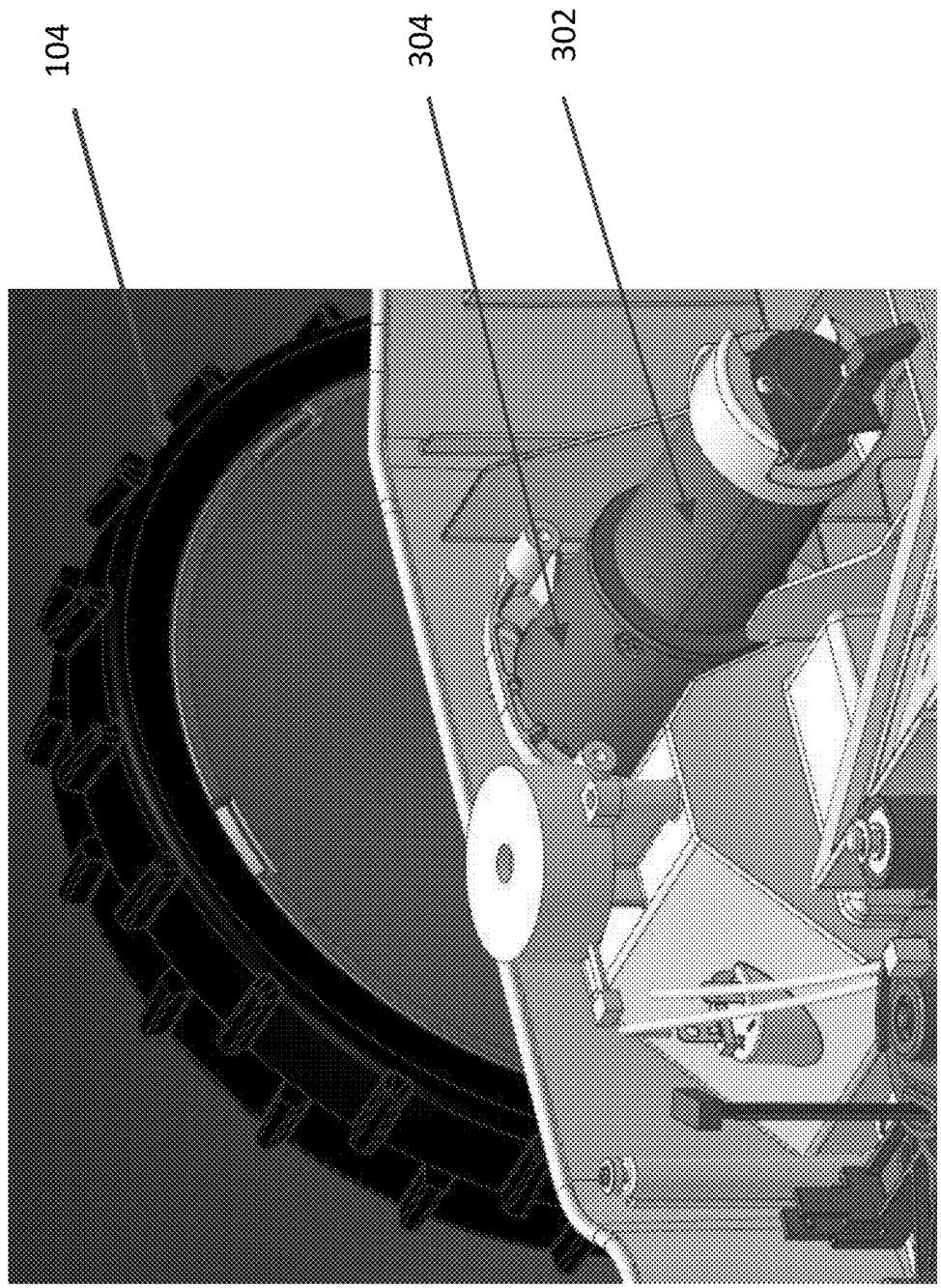
FIG. 18 is a diagram illustrating an example implementation of a wheel of the autonomous lawn mower of FIG. 1.
Figure 19:
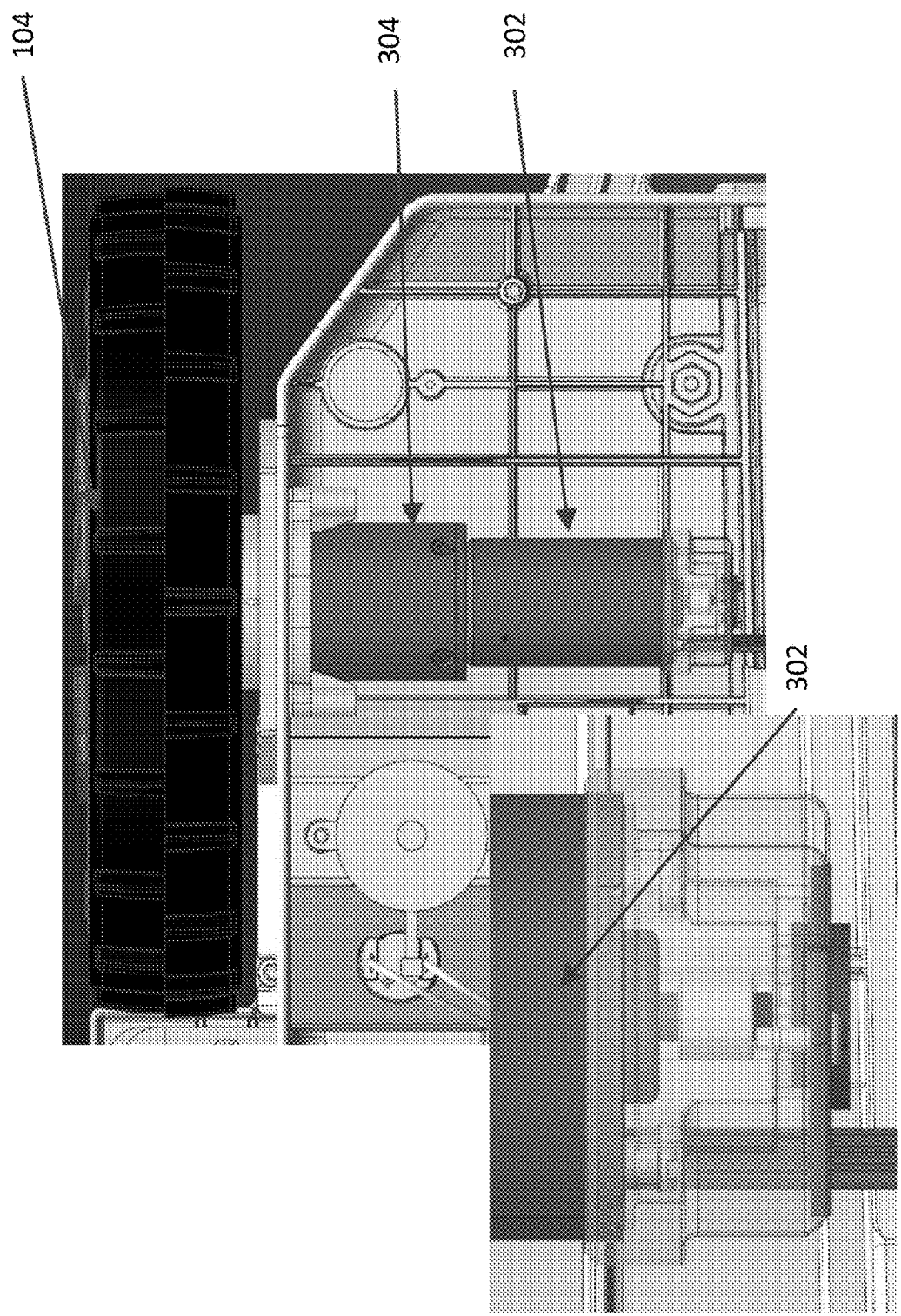
FIG. 19 are illustrations of an example implementation of a wheel of the autonomous lawn mower of FIG. 1.

With reference to FIGS. 18 to 19, there is provided an illustration of an autonomous lawn mower 100 comprising: a mower body 102 having at least one motor arranged to drive a cutting blade 212b and to propel the mower body 102 on an operating surface via a wheel arrangement, wherein the mower body 102 includes a navigation system 204 arranged to assist a controller 202 to control the operation of the mower body 102 within a predefined operating area 414; wherein the mower body 102 further includes a signal detecting module 222 arranged to detect a signal representative of a navigational marker and the navigation system 204 further includes an odometry module 202 arranged to track the movement of the mower body 102 on the operating surface.

Figure 20:
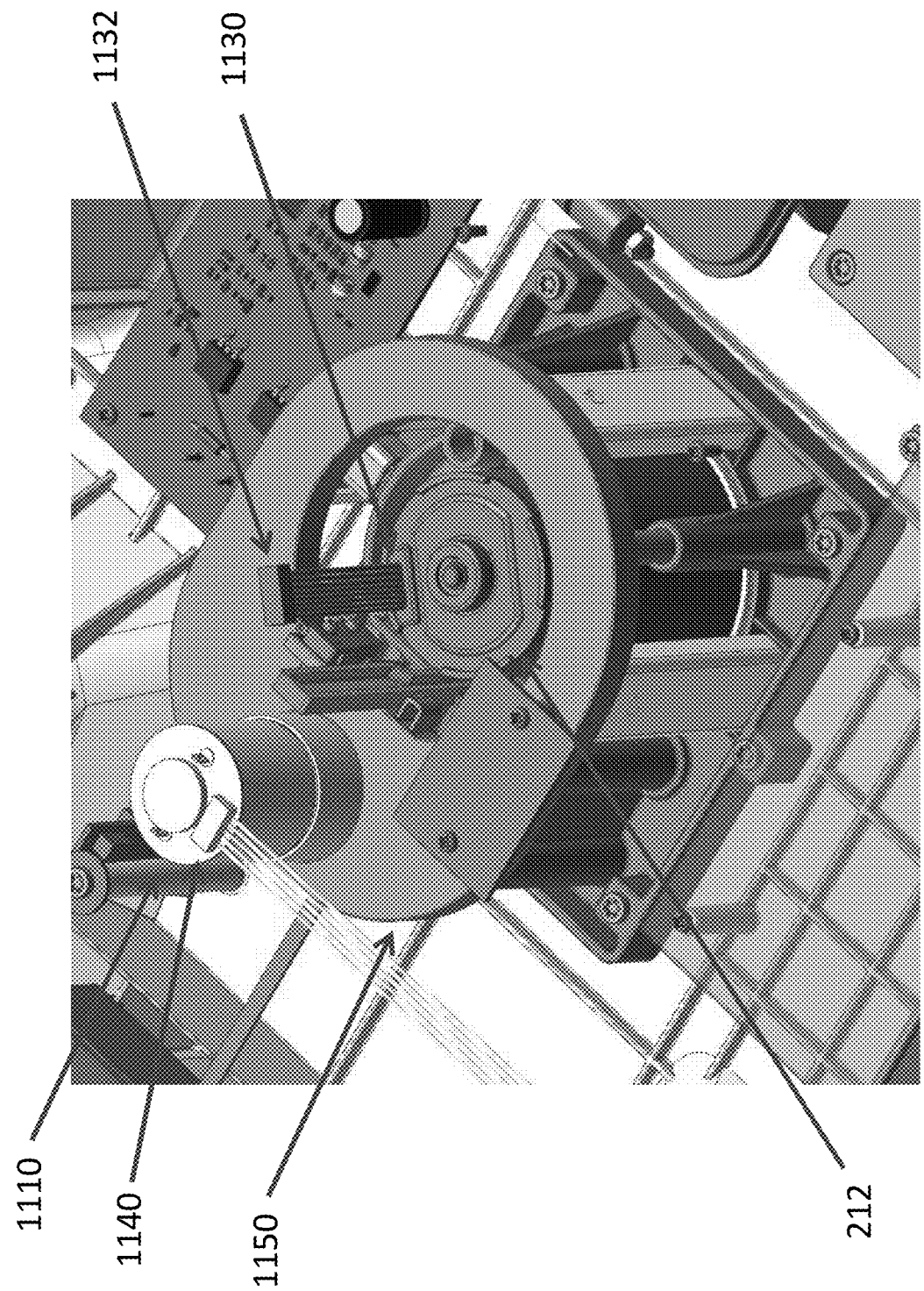
FIG. 20 are illustrations of another example implementation of a height adjustment system for the autonomous lawn mower of FIG. 1.
Figure 21:
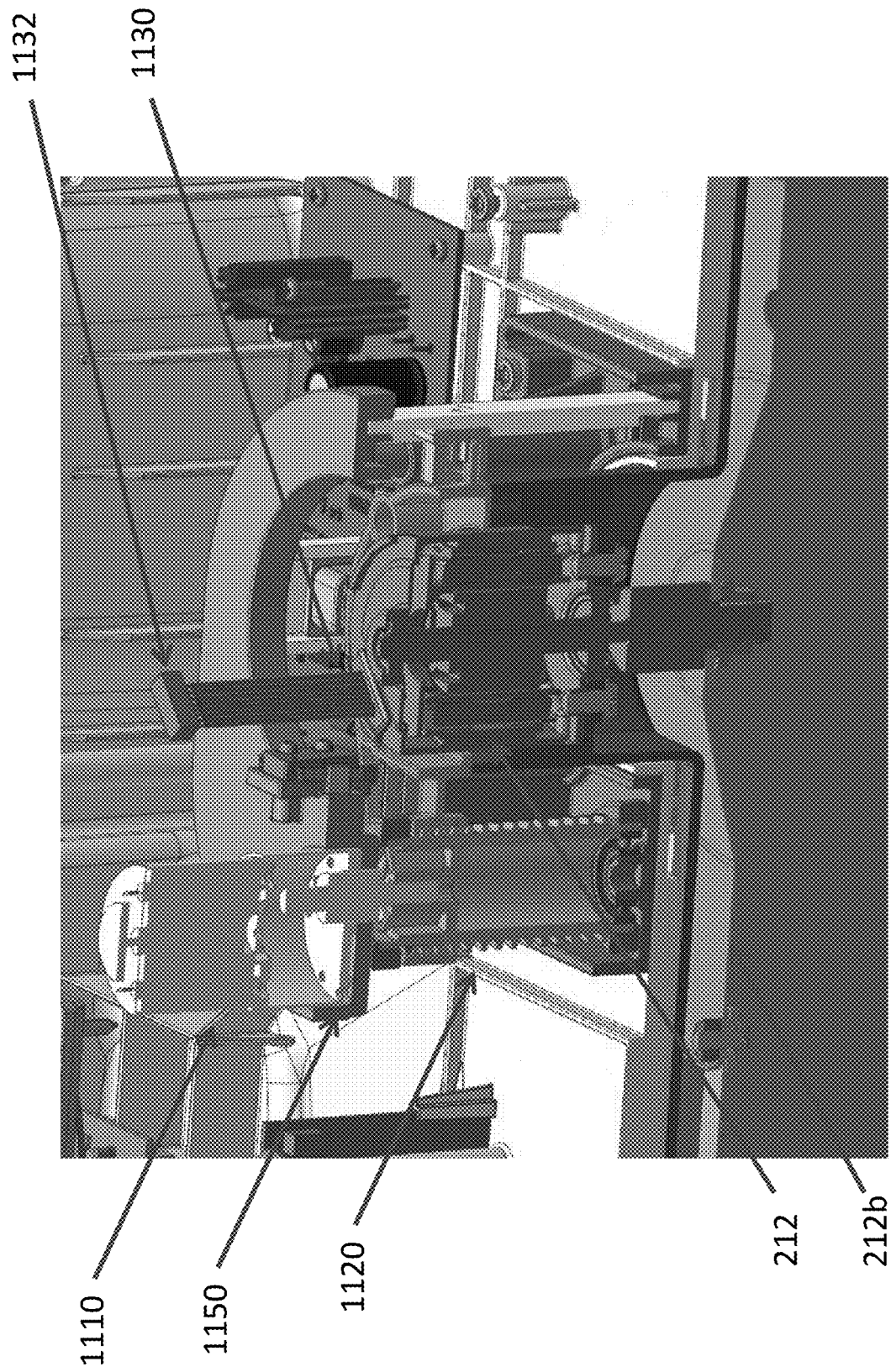
FIG. 21 is a diagram illustrating another example implementation of the height adjustment system of FIG. 20.
Figure 22:
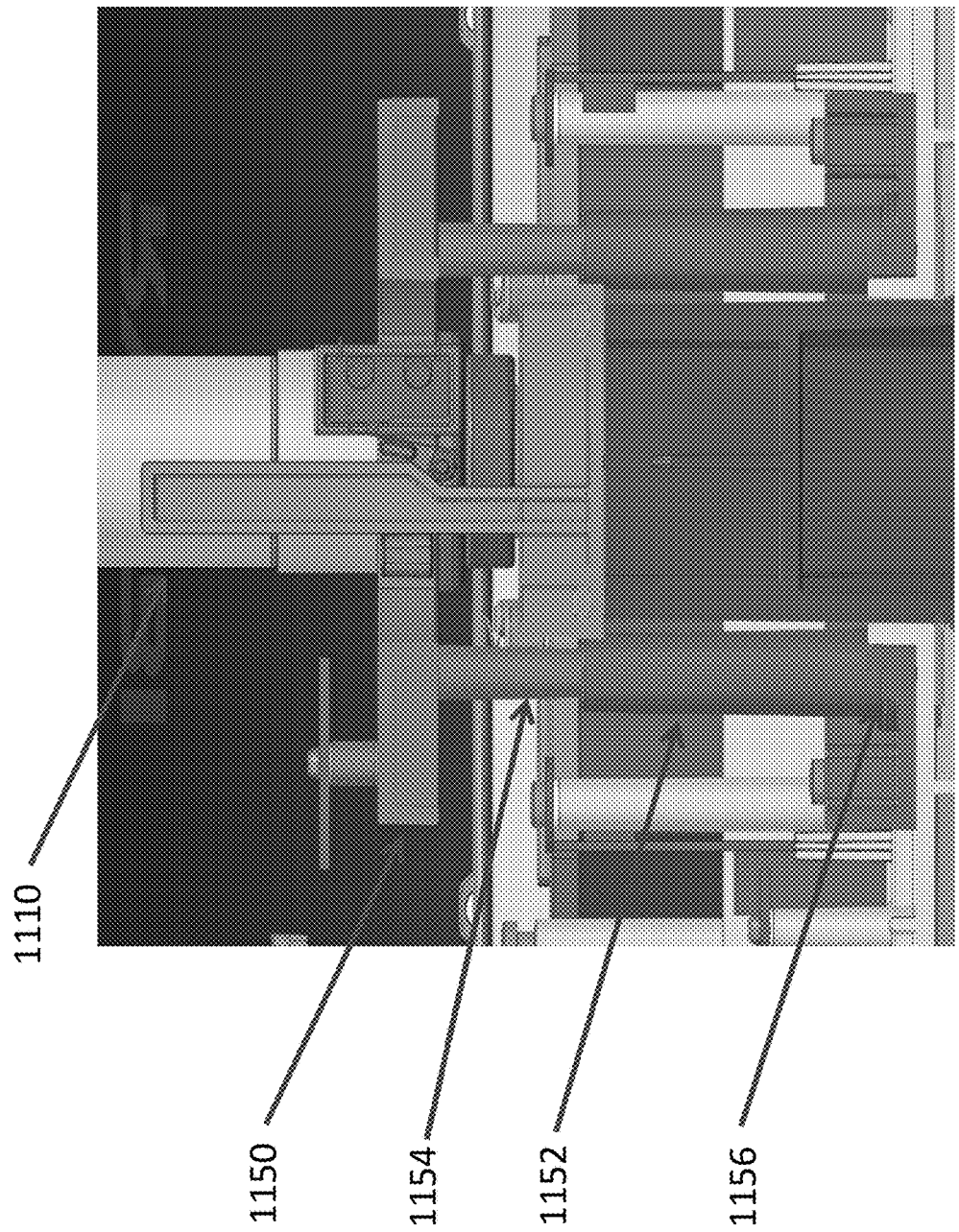
FIG. 22 is yet another illustration of an example implementation of the height adjustment system of FIG. 20.

With reference to FIGS. 20 to 22, there is provided an illustration of an autonomous lawn mower 100 comprising: a mower body 102 having at least one motor arranged to drive a cutting blade 212b and to propel the mower body 102 on an operating surface via a wheel arrangement, wherein the mower body 102 includes a navigation system 204 arranged to assist a controller 202 to control the operation of the mower body 102 within a predefined operating area 414; wherein the mower body 102 further includes a signal detecting module 222 arranged to detect a signal representative of a navigational marker and the mower body 102 further includes a height adjustment system 1100 arranged to assist the controller 202 to control the operation of the cutting blade 212b within a predefined operating height.

In this embodiment as shown in FIGS. 20 to 22, the autonomous lawn mower 100 includes a height adjustment system 1100 comprising a height adjustment motor 1110, a worm shaft 1120 driven by the height adjustment motor 1110, a limit switch 1130, and a hall sensor 1140. Advantageously, the motor 1110 may manipulate the rotating direction of the worm shaft 1120 in clockwise or anticlockwise directions, such that the height of the cutting blade 212b with respect to the operating surface may be manipulated by the motor 1110 indirectly.

The motor 1110 may be secured to the mower body 102 and remains stationary throughout the height adjusting operations. For instance, the cutting blade 212b may be moved towards the operating surface when the worm shaft 1120 rotates in a clockwise direction, and on the other hand, moved further away from the operating surface when the worm shaft 1120 rotates in an anti-clockwise direction.

Optionally, the mechanical transmission between the motor 1110 and the cutting blade 212b through the worm shaft 1120 may be enhanced by the use of a ring shaped structure 1150. In this embodiment, the ring shaped structure 1150 preferably comprises a plurality of bushings 1152, e.g. made of Polyoxymethylene (POM), a plurality of linear bearings 1156, or alternatively a combination thereof for supporting the height adjustment system 1100. Advantageously, the linear bearing 1156 may counter the torsional force induced by the distance between the worm shaft 1120 and the opposite support.

In one embodiment, the plurality of bushings 1152 may be disposed about the blade motor 212. A plurality of through holes 1154 may be disposed preferably equidistantly for receiving these bushings 1152, and at least one linear bearing 1156 may be disposed about the lower end of the bushing 1152 opposed to the worm shaft 1120. During the height adjusting operation, the ring shaped structure 1150 may reinforce the worm shaft 1120, such that the rotational force of the motor 1110 is converted into lateral forces steadily without out any vibrations or at least with minimal vibrations.

Although the worm shaft 1120 is located eccentrically to the central axis of the height adjustment system 1100 and it may inevitably exert a side loading against the height adjustment system 1100, the linear bearing 1156 may advantageously reduce the friction between the shaft 1120 and the ring shaped structure 1150 due to the bending moment. Accordingly, the rotational force of the motor 1110 is converted into lateral forces steadily without transmitting the bending moment to the height adjustment system 1100.

In this embodiment as shown in FIGS. 20 to 21, the limit switch 1130 is disposed on the blade motor 212, with a thin and elongated portion 1132 further extended away from the blade motor 212 and towards the inner mower body 102. Preferably, the hall sensor 1140 is disposed on top of the motor 1110 for detecting the presence of the elongated portion 1132 of the limit switch 1130, thereby determining if the cutting blade 212b has reached the maximum height with respect to the operating surface. Advantageously, the hall sensor 1140 may further derive the number of rotations required by the motor 1110 to reach the predefined desirable operating height, and in turn assist the controller 202 to control the operation of the cutting blade 212b.

Optionally, the combination of limit switch 1130 and hall sensor 1140 may be substituted by sensors e.g. photoelectric sensors. For instance, the photoelectric sensor may provide a signal to the height adjustment system 1100, indicating the height position of the cutting blade 212b, upon detecting the presence of the elongated portion 1132, or alternatively in the absence of the elongated portion 1132. It would also be appreciated by person skilled in the art that the sensing function may be achieved by other alternative sensing means.

In one example embodiment, the cut height of the blade assembly 212b is adjustable for carrying out a normal mowing operation at a desirable operating level. Initially, the blade assembly 212b is adjusted to an uppermost position through a first rotating direction of the blade motor 212 until the limit switch 130 is engaged by an engaging member (not shown). Subsequently, the blade motor 212 is driven in an opposite rotating direction until it reaches the desirable operating level. The vertical distance between the uppermost position of the blade assembly 212b and the desirable position of the blade assembly 212b is calculated by the hall sensor 1140.

Figure 23:
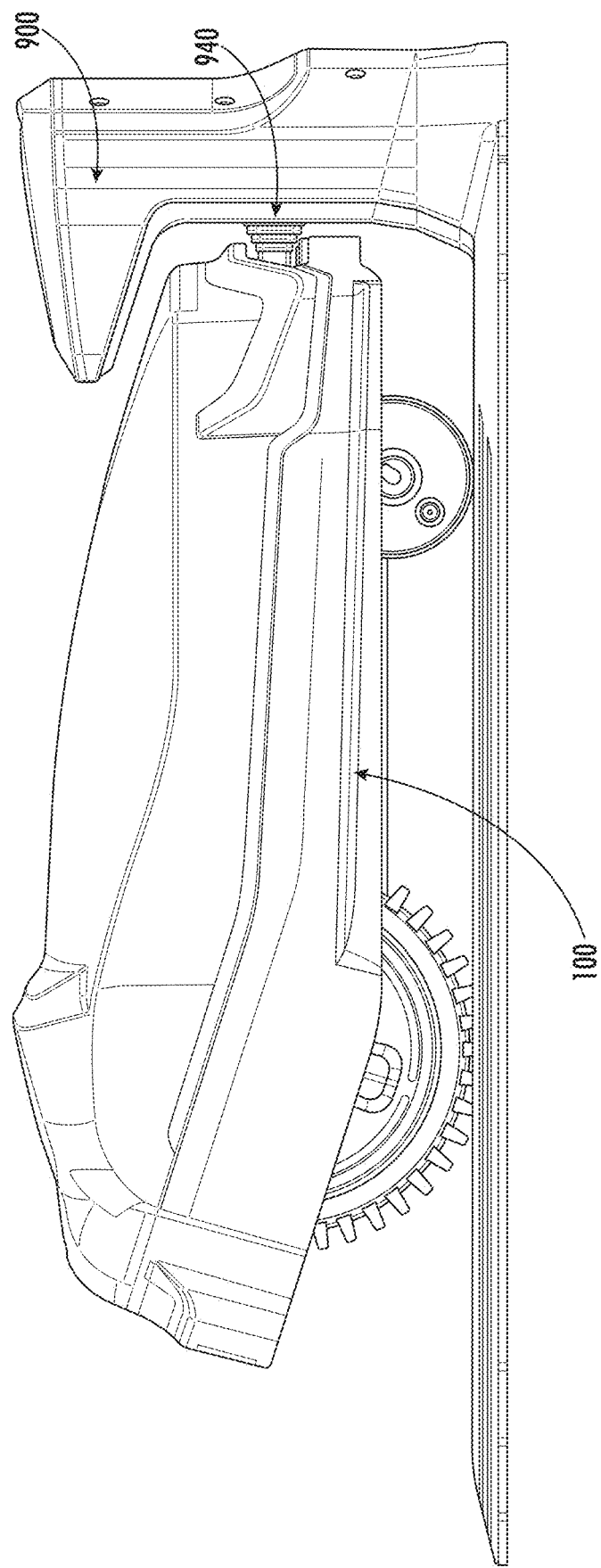
FIG. 23 are illustrations of an example implementation of a docking module of the autonomous lawn mower of FIG. 1.
Figure 24:
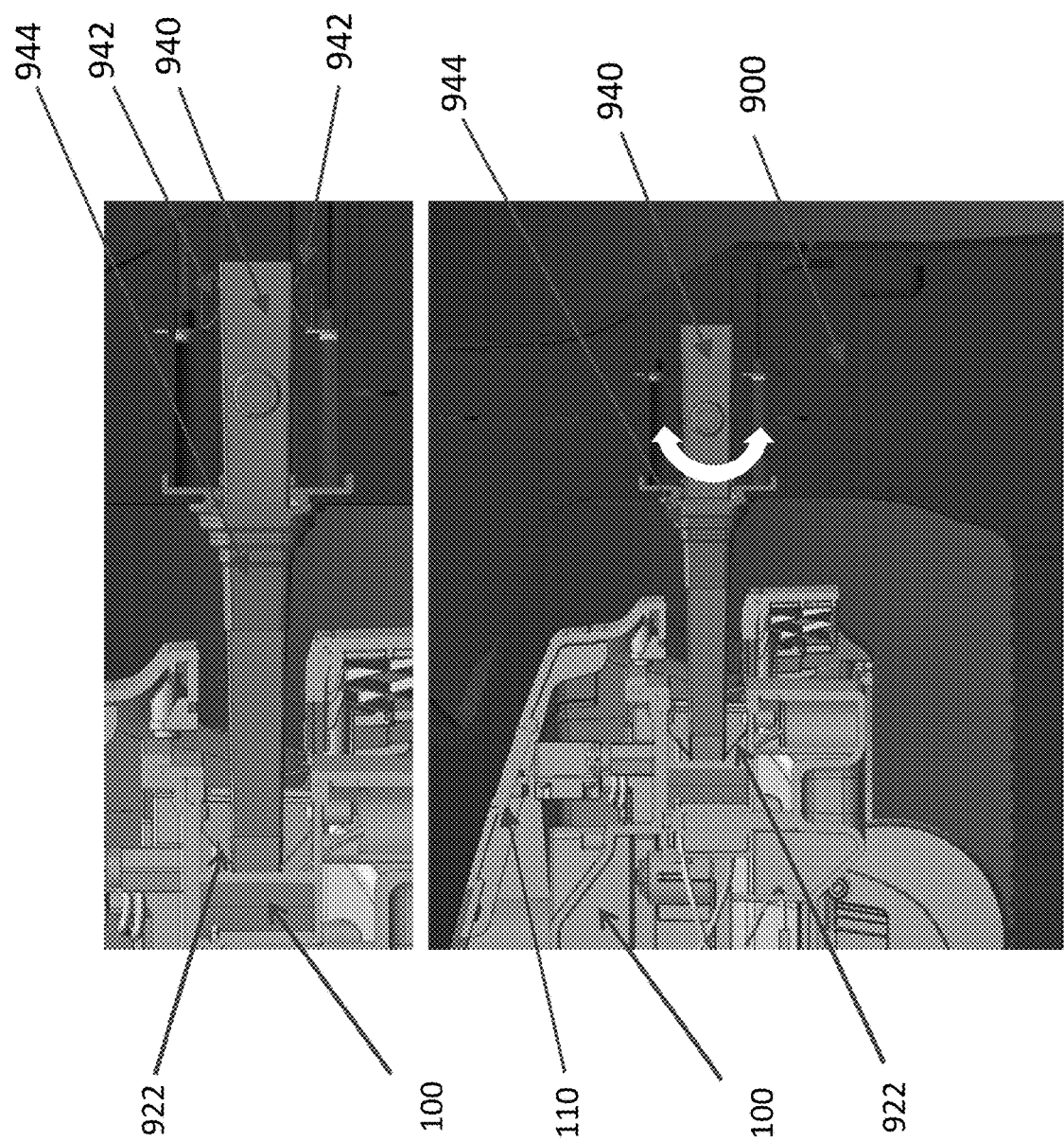
FIG. 24 are schematic diagrams illustrating an example implementation of a docking module of the autonomous lawn mower of FIG. 1.

With reference to FIGS. 23 to 24, there is provided an illustration of an autonomous lawn mower 100 comprising: a mower body 102 having at least one motor arranged to drive a cutting blade 212b and to propel the mower body 102 on an operating surface via a wheel arrangement, wherein the mower body 102 includes a navigation system 204 arranged to assist a controller 202 to control the operation of the mower body 102 within a predefined operating area; a detachable docking module 900 arranged to provide battery charging to the mower body 102; wherein the mower body 102 further includes a signal detecting module 222 arranged to detect a signal representative of a navigational marker.

Preferably, the detachable docking module 900 further includes a rotatable member 940 arranged to contact the mower body 102 with a predefined vertical offset relative to the detachable docking module 900 for battery charging.

Upon the lawn mower 100 has been used over certain time period, there may be an offset between the opening 922 of the motor body 102 and the charging terminal. For instance, if there is mud and grass stuck on the mower's wheels 104, the height of the mower 100 may be shifted upwards relative to the docking station 900. Furthermore, if the wheels 104 wear down over time, the height of the charging area on the mower 100 may be lowered relative to the docking station 900. A rotatable charging member 940 may compensate such vertical offset between the docking station 900 and the mower body 102.

In one example, there may be provided a rotatable, spring loaded charging terminals 940. The rotatable member 940 may extend laterally from the detachable docking module 900 and pivotable about a horizontal axis that is parallel to the operating surface. On the other hand, the mower body 102 may include an opening 922 for receiving the rotatable member 940. Advantageously, the charging terminals 940 may be pivotable about an axis perpendicular to the charging terminals 940 such that the terminal 940 may rotate only in the vertical direction within a desirable range of rotation angles, rather than rotate in the horizontal direction.

To maintain the orientation of the rotatable member 940 upon the rotatable member 940 is inserted into the opening 922 of a mower body 102 with a vertical offset therebetween, the docking module 900 may provide a pair of resilient means 942 for acting against the opposite sides of the rotatable member 940. For instance, a pair of springs 942 may be used to ensure that the terminals 940 rest at the nominal designed position and do not sag due to gravity.

Optionally, to facilitate the matching between the rotatable member 940 and the opening 922 with a substantial vertical offset therebetween, the rotatable member 940 may further provide a flexible, protective gasket 944 e.g. made of rubber for reducing the impact between the rotatable member 940 and the mower body 102 during the docking process. Advantageously, the protective gasket 944 provides a tight sealing between the rotatable member 940 and the mower body 102 and allows a flexible rotation of the rotatable member 940.

Figure 25:
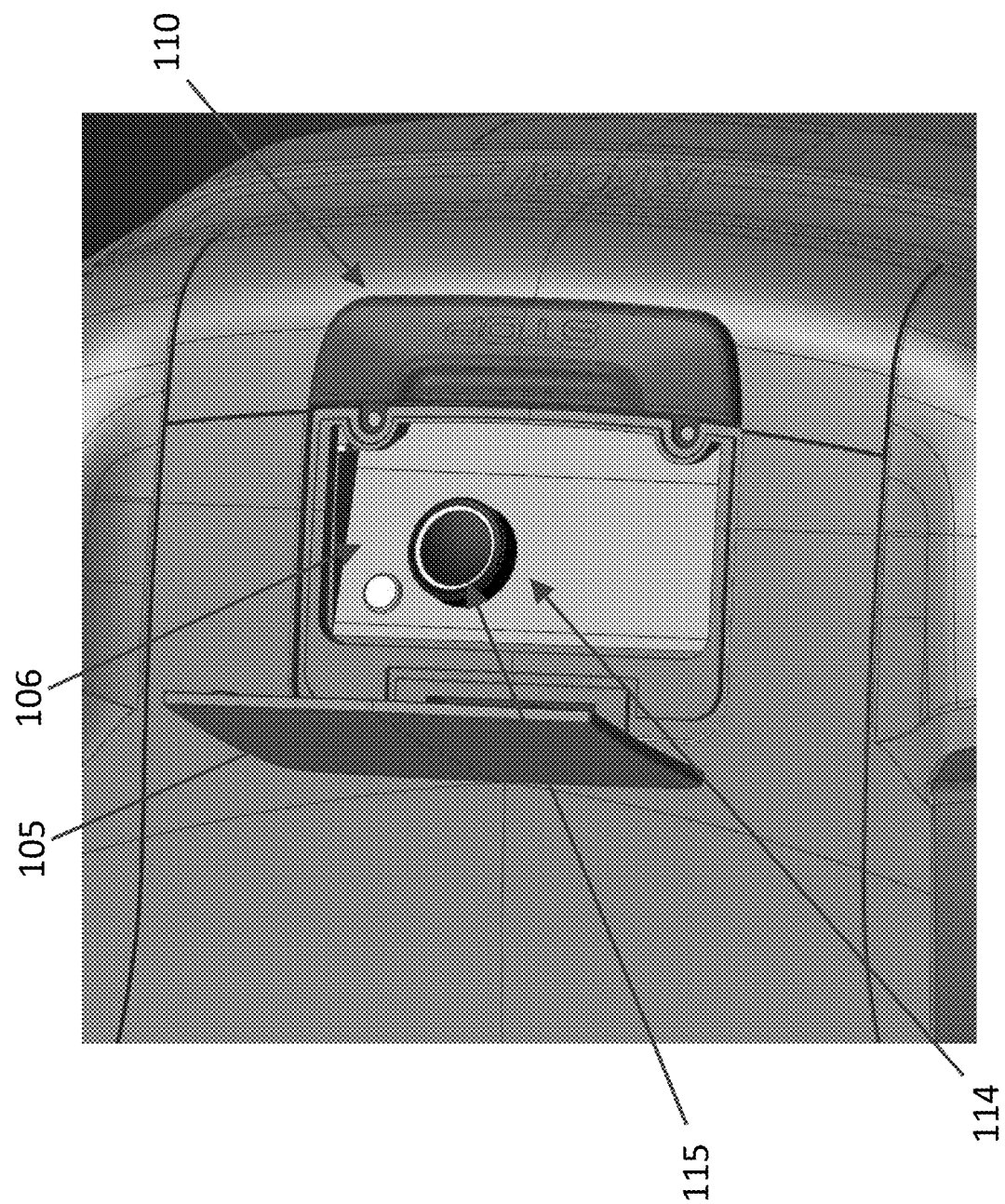
FIG. 25 are illustrations of an example implementation of an emergency shut-off switch of the autonomous lawn mower of FIG. 1.
Figure 26:
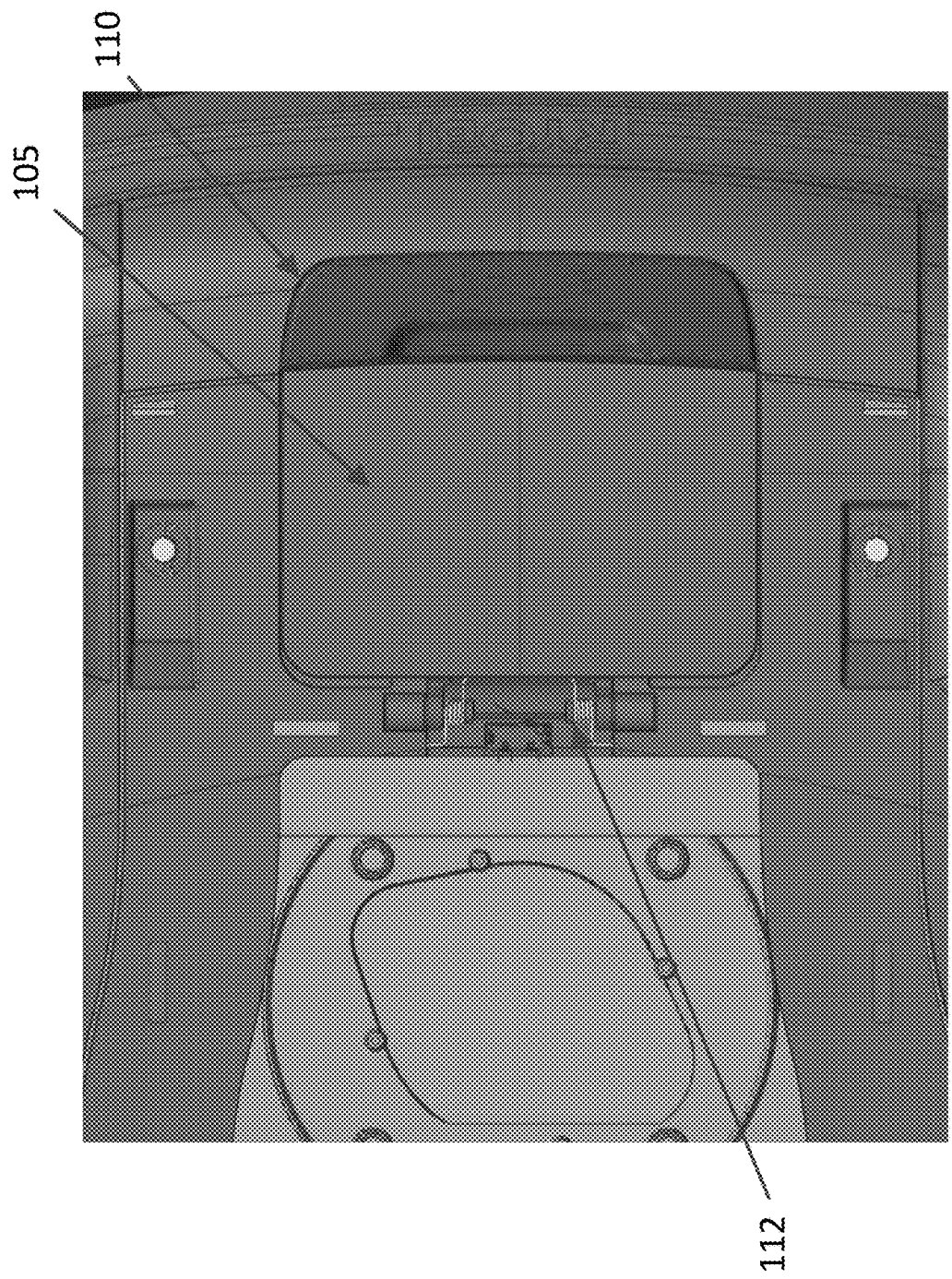
FIG. 26 is a diagram illustrating an example implementation of the emergency shut-off switch of FIG. 25.
Figure 27:
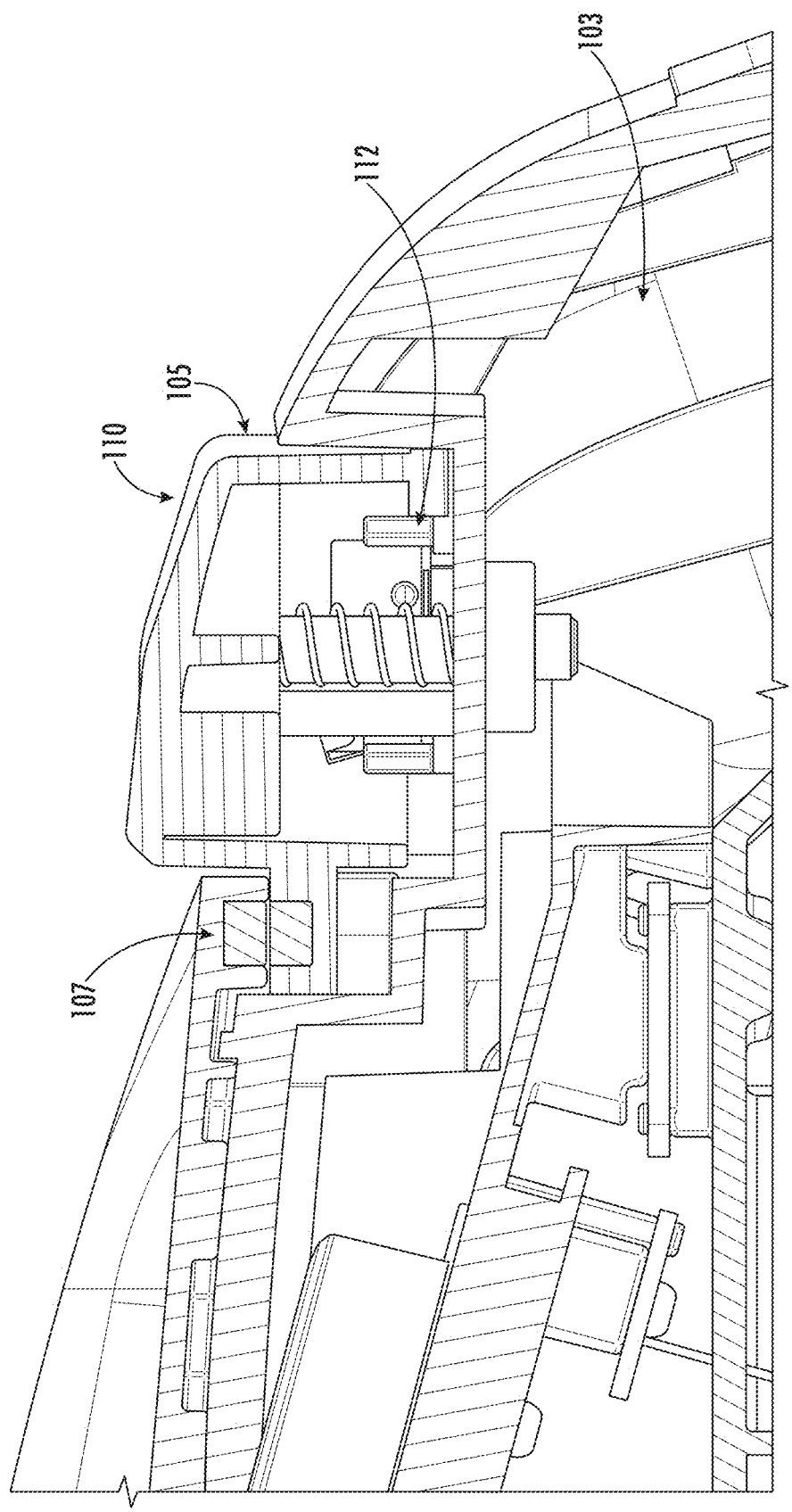
FIG. 27 is yet another illustration of an example implementation of the emergency shut-off switch of FIG. 25.

With reference to FIGS. 25 to 27, there is provided an illustration of an autonomous lawn mower 100 comprising: a mower body 102 having at least one motor arranged to drive a cutting blade 212*b* and to propel the mower body 102 on an operating surface via a wheel arrangement, wherein the mower body 102 includes a navigation system 204 arranged to assist a controller 202 to control the operation of the mower body 102 within a predefined operating area, wherein the mower body 102 further includes a signal detecting module 222 arranged to detect a signal representative of a navigational marker and an actuator for terminating the operation of the mower 100 and, in response to the termination of the mower 100 operation, releasing a portion of the mower body 102 from a closed position at which a user control interface is covered to an opened position at which the user control interface is exposed.

In one example, the mower body 102 has a chassis 103 e.g. a base, a hood 105 e.g. cover of a control compartment/panel 106 movable relative to the chassis 103, and one or more magnetic sensors 107 mounted for detecting displacement of the hood 105 relative to the chassis 103. An actuator 110 e.g. an emergency shut-off switch, in the form of a push button or embedding a micro switch 112, is provided in a recess of the hood 105 and communicated with the magnetic sensors 107.

There is also provided an operation interface 114 with a stop button 115, and a display (not shown) within the chassis 103 and concealed by the hood 105 during normal operation. The emergency shutoff switch 110, when actuated by the user, stops the autonomous lawn mower 100 and releases the hood cover 105 to expose the control compartment/panel 106 to the user.

Figure 28:
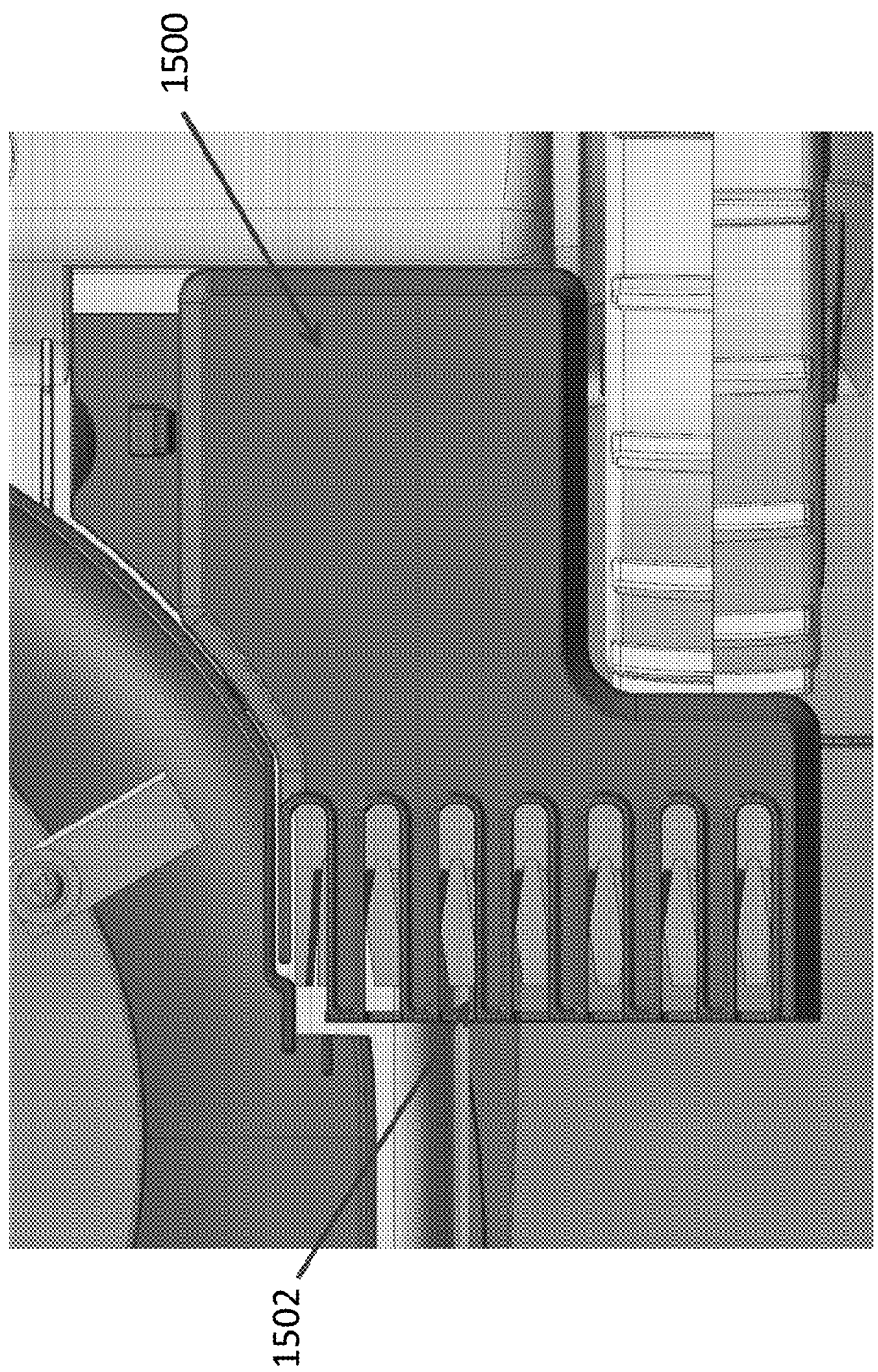
FIG. 28 are illustrations of an example implementation of a cutter module of the autonomous lawn mower of FIG. 1.
Figure 29:
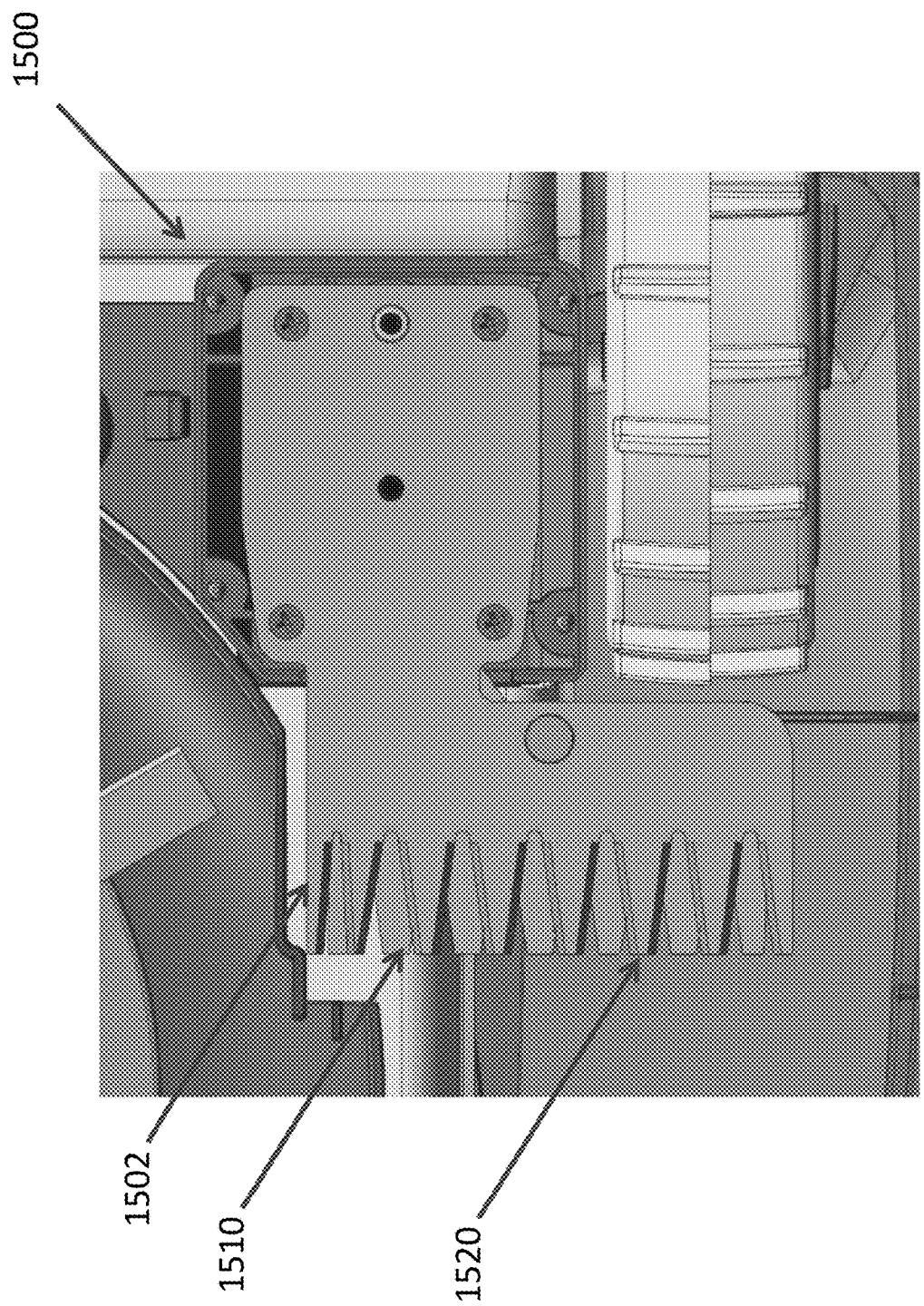
FIG. 29 is a diagram illustrating an example implementation of the cutter module of FIG. 28.
Figure 30:
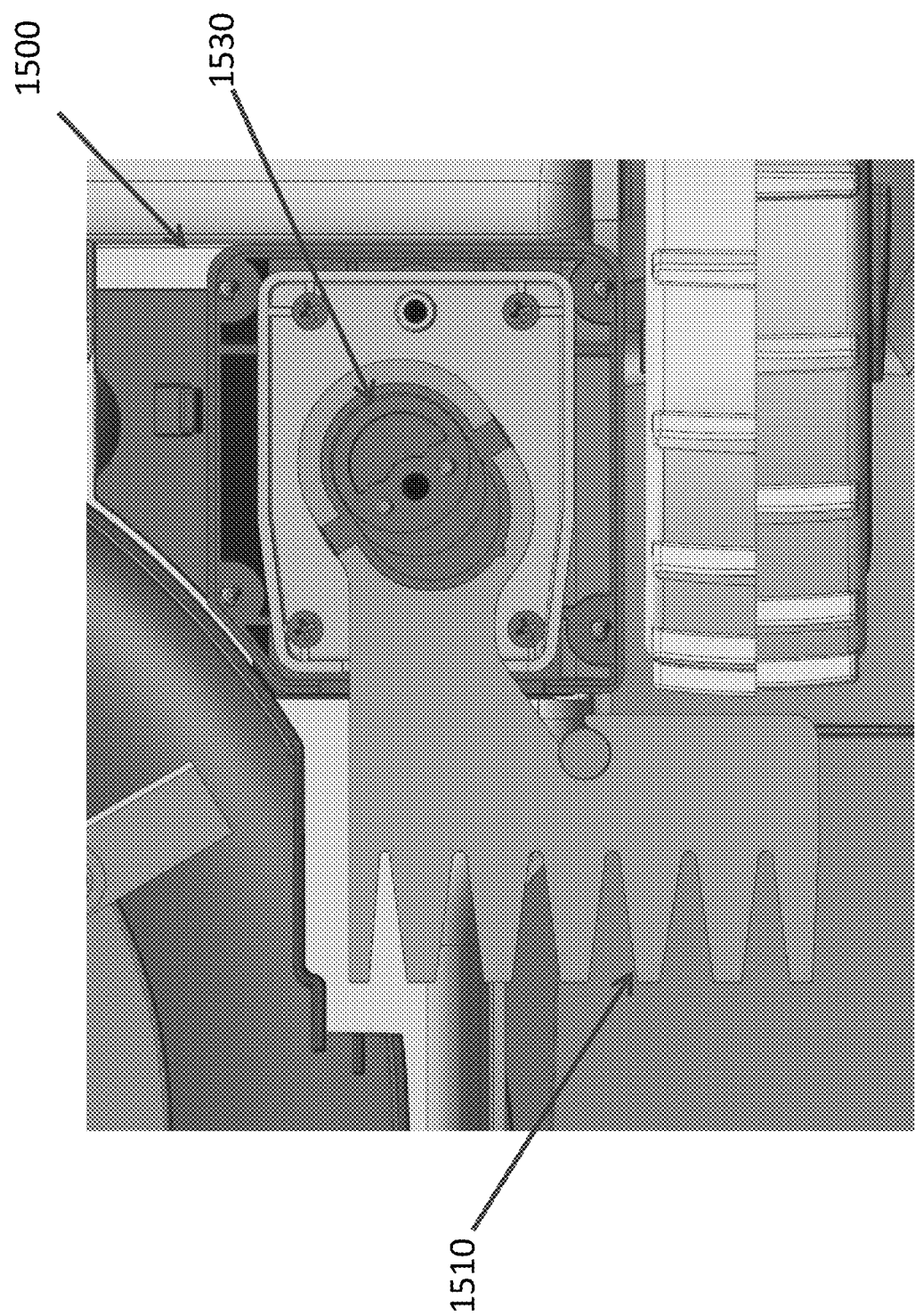
FIG. 30 is yet another illustration of an example implementation of the cutter module of FIG. 28.

With reference to FIGS. 28 to 30, there is provided an illustration of an autonomous lawn mower 100 comprising: a mower body 102 having at least one motor arranged to drive a cutting blade 212*b* and to propel the mower body 102 on an operating surface via a wheel arrangement, wherein the mower body 102 includes a navigation system 204 arranged to assist a controller to control the operation of the mower body 102 within a predefined operating area, wherein the mower body 102 further includes a signal detecting module arranged to detect a signal representative of a navigational marker and a cutter module arranged to trim the edges of the predefined operating area.

In this embodiment as shown in FIGS. 29 to 30, the autonomous lawn mower 100 includes a cutter module 1500 positioned underneath the mower body 102 and transverse to the longitudinal axis of the mower body 102. The cutter module 1500 includes a perimeter cutter 1502 for trimming the edges of a predefined operating area 414. Preferably, the cutting module 1500 includes at least two cutting bars 1510, 1520 movable in a reciprocating manner. The cutting bars 1510, 1520 are each driven by a driving motor 1530 respectively. Optionally, the cutting bars 1510, 1520 may be driven by two individual motors (not shown) individually.

Figure 31:
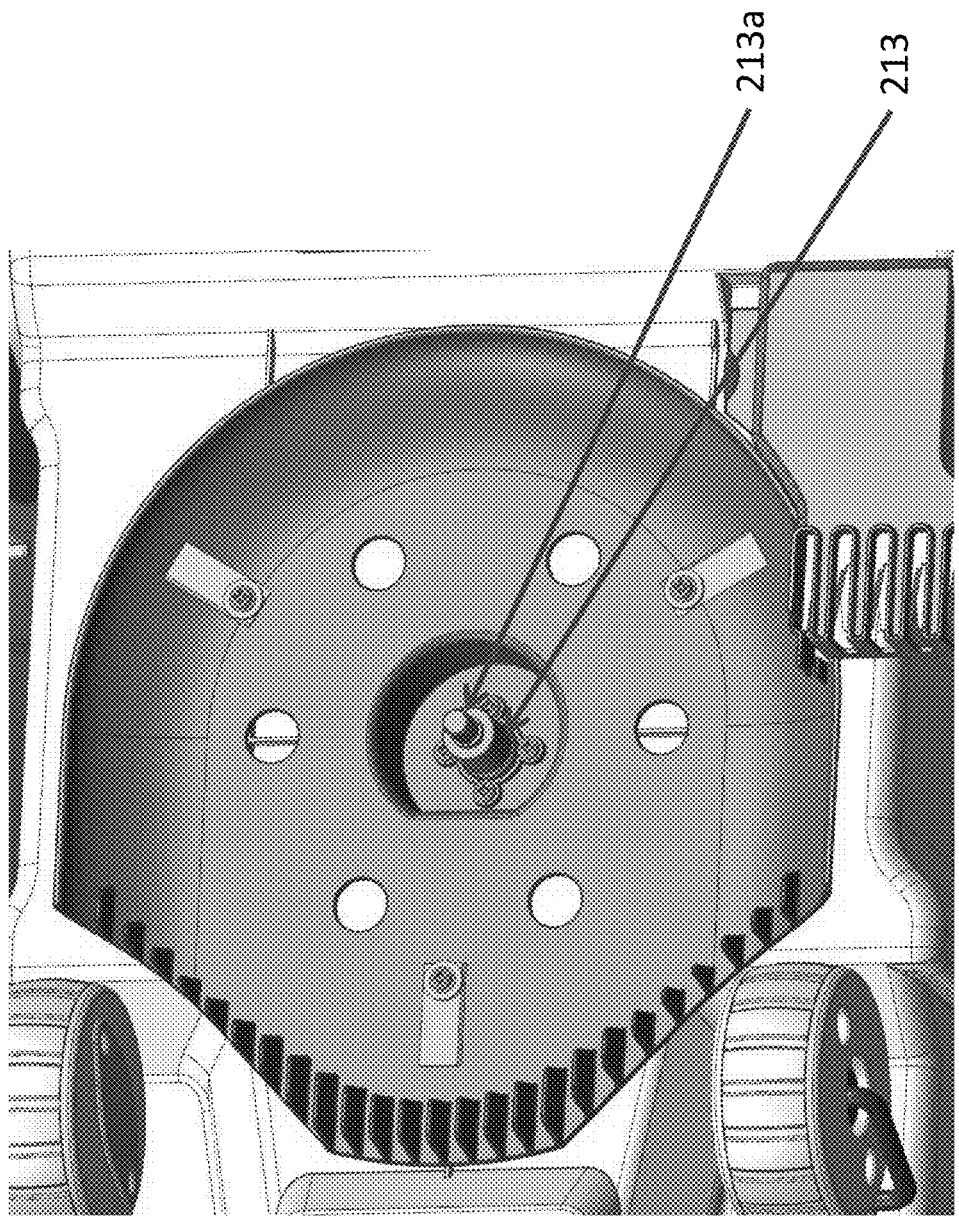
FIG. 31 are illustrations of an example implementation of a blade adjustment system of the autonomous lawn mower of FIG. 1.
Figure 32:
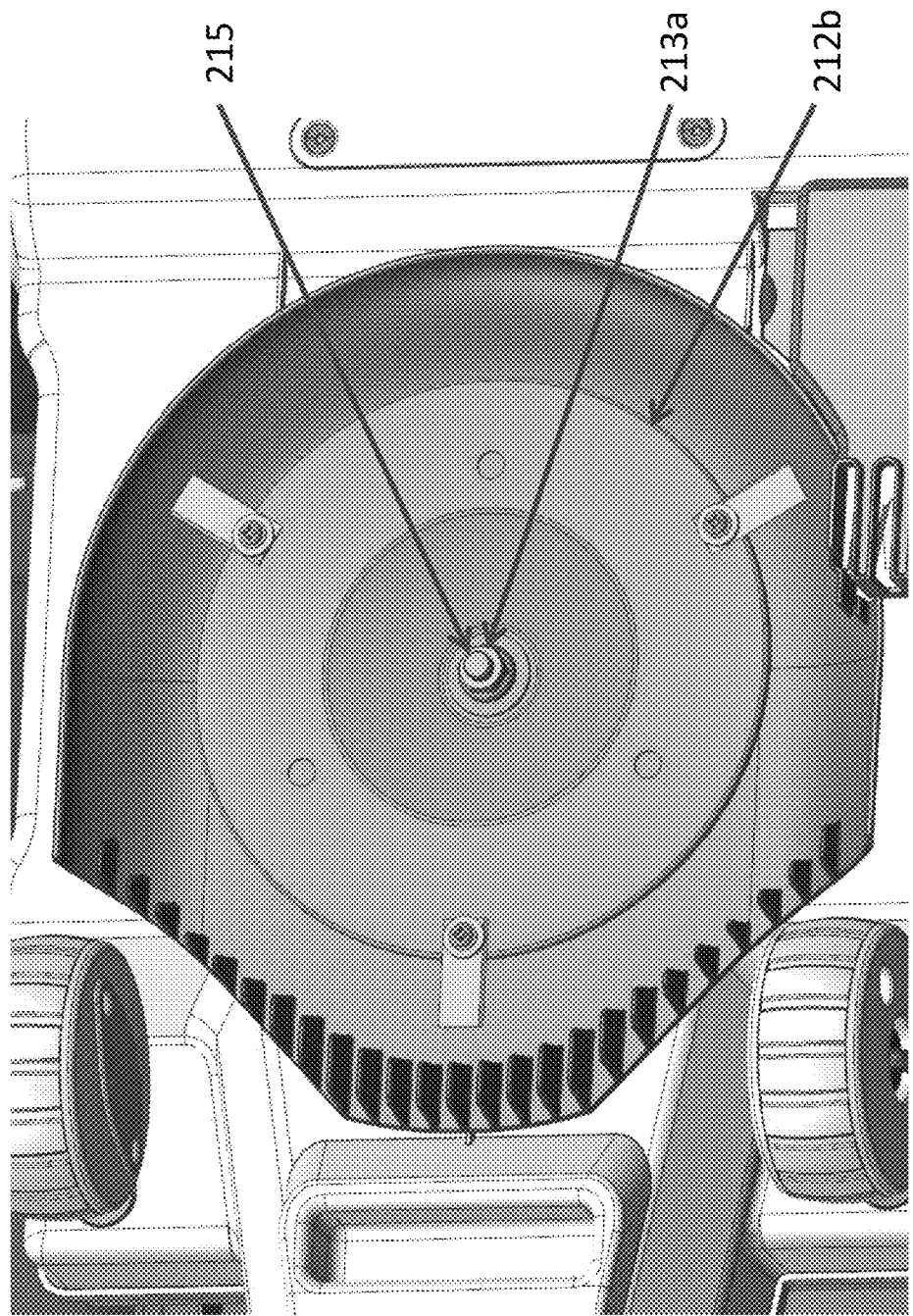
FIG. 32 is a diagram illustrating an example implementation of the blade adjustment system of FIG. 31.
Figure 33:
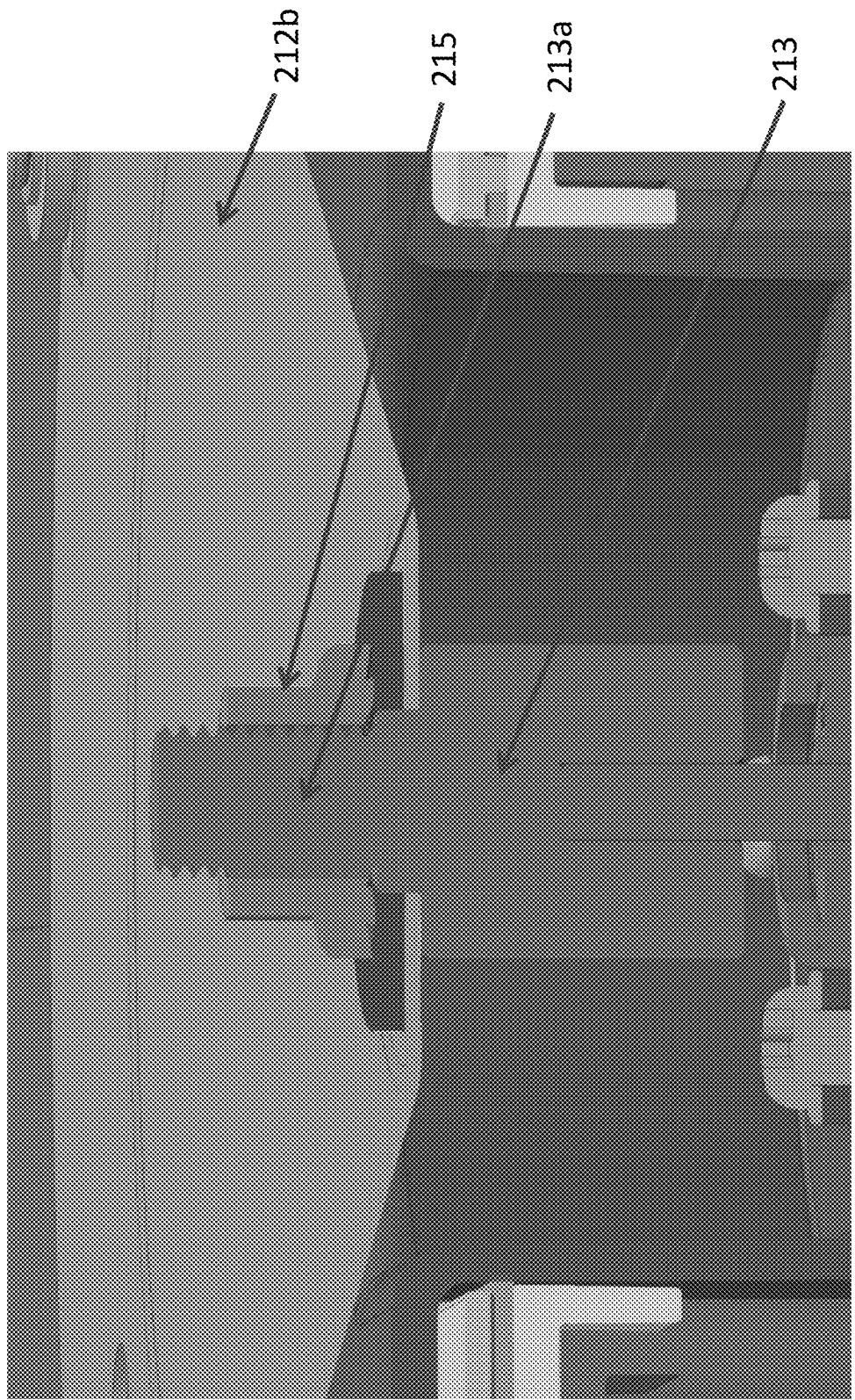
FIG. 33 is yet another illustration of an example implementation of the blade adjustment system of FIG. 31.

With reference to FIGS. 31 to 33, there is provided an illustration of an autonomous lawn mower 100 comprising: a mower body 102 having at least one motor arranged to drive a cutting blade 212*b* and to propel the mower body 102 on an operating surface via a wheel arrangement, wherein the mower body 102 includes a navigation system 204 arranged to assist a controller 202 to control the operation of the mower body 102 within a predefined operating area 414, wherein the mower body 102 further includes a signal detecting module arranged to detect a signal representative of a navigational marker and a blade adjustment system arranged to adjust the vertical position of the cutting blade 212*b* along its rotating axis 213.

In this embodiment as shown in FIGS. 31 to 33, the cutting blade 212*b* is rotatably mounted on a rotating shaft 213 driven by the motor 212. The front end of the rotating shaft 213 is provided external thread 213*a* about which a nut 215 is rotatably mounted for sandwiching the centre portion of the cutting blade 212*b* therebetween. The advantages of the blade adjustment system in that, the position of the nut 215 may be adjusted along the external thread 213*a*. This ensures that the lawn mower 100 may be readily adapted for accommodating cutting blades 212*b* with different thickness.

Figure 34:
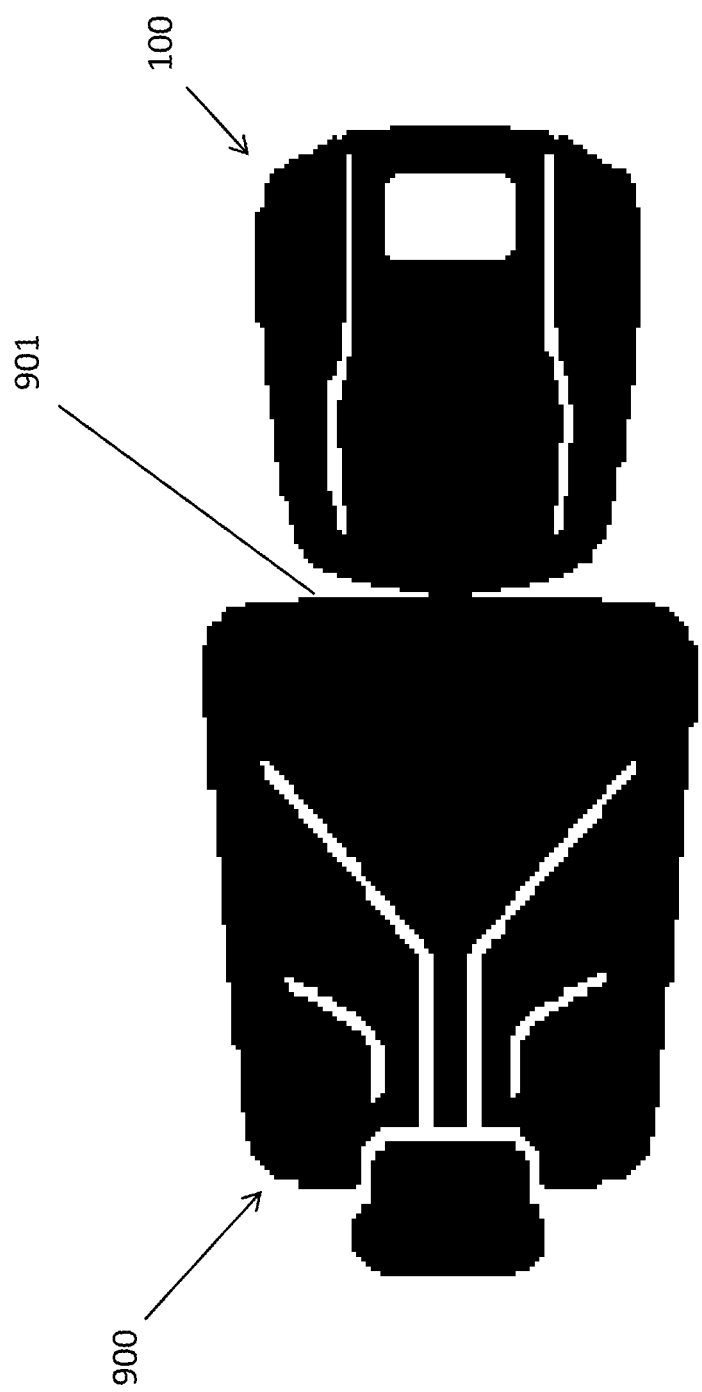
FIG. 34 is a diagram illustrating an example implementation of the calibration method of the autonomous lawn mower of FIG. 1.

With reference finally to FIG. 34, there is provided a method of calibrating the autonomous lawn mower 100. In one example embodiment, the autonomous lawn mower 100 is positioned in front of the docking station 900. To trigger the calibration, the autonomous lawn mower 100 is positioned to face towards the docking station charging terminal and adjacent to the edge of the docking pad 901. In response to this triggering act, the docking station yew angle is measured and such measurement may assist the docking the aforesaid docking process. Preferably, the power of the signal of the boundary wire 410 received by the induction sensor is magnified by a predetermined factor, thereby improving the calibration accuracy.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An autonomous lawn mower comprising:
   a mower body having at least one motor arranged to drive a cutting blade and to propel the mower body on an operating surface via a wheel arrangement, wherein the mower body includes a navigation system arranged to assist a controller to control an operation of the mower within a predefined operating area, and wherein the mower body further includes an actuator for terminating the operation of the mower and, in response to the termination of the operation of the mower, releasing a portion of the mower body from a closed position at which a user control interface is covered to an opened position at which the user control interface is exposed.

2. The autonomous lawn mower of claim 1, wherein the mower body further includes a signal detecting module arranged to detect a signal representative of a navigational marker, and wherein the navigational marker includes a location of an obstacle or boundary.

3. The autonomous lawn mower of claim 2, wherein the navigation system determines a position of the mower body within the predefined operating area based on the location of the obstacle or boundary.

4. The autonomous lawn mower of claim 2, further including a signal generating module arranged to generate the signal in the form of a signal loop.

5. The autonomous lawn mower of claim 4, wherein the signal detecting module includes a sensor arranged to detect a magnitude of the signal loop.

6. The autonomous lawn mower of claim 5, wherein the signal generating module generates a first signal loop within the predefined operating area whereby a position of the mower body relative to the predefined operating area is determined by the controller based on the magnitude of the first signal loop detected by the sensor.

7. The autonomous lawn mower of claim 6, wherein the first signal loop is emitted about a boundary of the predefined operating area.

8. The autonomous lawn mower of claim 6, wherein the signal generating module is positioned on a detachable docking module that detachably receives the mower body.

9. The autonomous lawn mower of claim 8, wherein the detachable docking module generates a second signal loop within a predefined docking area about the detachable docking module whereby the position of the mower body relative to the detachable docking module within the predefined docking area is determined by the controller based on a magnitude of the second signal loop detected by the sensor.

10. The autonomous lawn mower of claim 9, wherein the first and second signal loops are time shifted pulses with a same frequency.

11. The autonomous lawn mower of claim 9, wherein the sensor receives a pulse of the first and second signal loops when the mower body is at a position inside the predefined operating area and the predefined docking area.

12. The autonomous lawn mower of claim 11, wherein the controller identifies the first and second signal loops individually based on a time shift between the pulse of the first signal loop and a pulse of the second signal loop.

13. The autonomous lawn mower of claim 9, wherein the first signal loop includes a bidirectional current pulse.

14. The autonomous lawn mower of claim 9, wherein the sensor receives only the pulse of the first signal loop when the mower body is at a position inside the predefined operating area and outside the predefined docking area.

15. The autonomous lawn mower of claim 9, wherein the sensor detects opposite polarities of the first signal loop when the mower body is positioned at a position inside the predefined operating area and a position outside the predefined operating area respectively.

16. The autonomous lawn mower of claim 15, wherein the sensor detects a first polarity of the first signal loop when the mower body is at a position inside the predefined operating area.

17. The autonomous lawn mower of claim 16, wherein the sensor detects a second, opposite polarity of the first signal loop when the mower body is at a position outside the predefined operating area.

18. The autonomous lawn mower of claim 9, wherein the sensor comprises a plurality of sensors, whereby the controller terminates a movement of the mower body upon all of the plurality of sensors becoming sandwiched between the first and second signal loops.

19. The autonomous lawn mower of claim 8, wherein the detachable docking module is configured to provide battery charging to the mower body.

20. The autonomous lawn mower of claim 19, wherein the detachable docking module includes a rotatable member arranged to contact the mower body with a predefined vertical offset relative to the detachable docking module for battery charging.

21. The autonomous lawn mower of claim 20, wherein the detachable docking module comprises a pair of resilient structures that act against opposite sides of the rotatable member to maintain an orientation of the rotatable member.

22. The autonomous lawn mower of claim 20, wherein the rotatable member comprises a protective gasket for sealing between the rotatable member and the mower body and for flexible rotation of the rotatable member.

23. The autonomous lawn mower of claim 1, wherein the actuator is arranged to actuate a micro switch for releasing the portion of the mower body from the closed position.

24. The autonomous lawn mower of claim 1, wherein the actuator is in communication with a magnetic sensor arranged to sense the movement of the portion of the mower body between the closed position and the opened position.

25. The autonomous lawn mower of claim 1, wherein the mower body further includes a cutter module arranged to trim one or more edges of the predefined operating area.

26. The autonomous lawn mower of claim 25, wherein the cutting module includes at least two cutting bars movable in a reciprocating manner.

27. The autonomous lawn mower of claim 25, wherein the cutting module is placed at a position underneath the mower body and transverse to a longitudinal axis of the mower body.

28. The autonomous lawn mower of claim 1, wherein the mower body further includes a height adjustment system arranged to assist the controller to restrict an operation of the cutting blade within a predefined operating height.

29. The autonomous lawn mower of claim 28, wherein the height adjustment system includes one or more sensors arranged to detect a presence of the cutting blade at a predetermined vertical position.

30. The autonomous lawn mower of claim 29, wherein the height adjustment system is arranged to communicate with the controller for terminating the operation of the cutting blade upon the cutting blade reaching the predetermined vertical position.

31. The autonomous lawn mower of claim 1, wherein the navigation system further includes an odometry module arranged to track a movement of the mower body on the operating surface.

32. An autonomous lawn mower comprising a mower body including an actuator for terminating an operation of the autonomous lawn mower and, in response to the termination of the autonomous lawn mower operation, releasing a portion of the mower body from a closed position at which a user control interface is covered to an opened position at which the user control interface is exposed.

33. The autonomous lawn mower of claim 32, wherein the actuator comprises an emergency shut-off switch disposed adjacent to the portion of the mower body, and wherein the emergency shut-off switch is accessible from an exterior of the mower body.

34. The autonomous lawn mower of claim 32, wherein the portion of the body comprises a hood that pivots between the opened position and the closed position, and wherein the user control interface is disposed between a pivot axis of the hood and the actuator.

35. The autonomous lawn mower of claim 32, wherein the autonomous lawn mower further comprises one or more magnetic sensors for detecting displacement of the portion of the mower body from the closed position to the opened position.

36. The autonomous lawn mower of claim 32, wherein the autonomous lawn mower further comprises an opening configured to receive a charging terminal of a dock, and wherein the opening and actuator are disposed at opposite ends of the mower body.

37. The autonomous lawn mower of claim 32, wherein the actuator is arranged to actuate a micro switch for releasing the portion of the mower body from the closed position.

38. The autonomous lawn mower of claim 32, wherein the mower body further includes a cutter module arranged to trim one or more edges of a predefined operating area.

39. The autonomous lawn mower of claim 38, wherein the cutting module includes at least two cutting bars movable in a reciprocating manner.

40. The autonomous lawn mower of claim 32, wherein the mower body further includes a height adjustment system arranged to assist a controller of the autonomous lawn mower to restrict an operation of a cutting blade within a predefined operating height.

41. The autonomous lawn mower of claim 40, wherein the height adjustment system includes one or more sensors arranged to detect a presence of the cutting blade at a predetermined vertical position.

42. The autonomous lawn mower of claim 41, wherein the height adjustment system is arranged to communicate with the controller for terminating operation of the cutting blade upon the cutting blade reaching the predetermined vertical position.

43. The autonomous lawn mower of claim 32, wherein the mower body further comprises at least one motor arranged to drive a cutting blade and to propel the mower body on an operating surface via a wheel arrangement, and wherein the mower body includes a navigation system arranged to assist a controller to control an operation of the mower body within a predefined operating area.

44. A method of accessing a user control interface concealed by a hood of an autonomous lawn mower, the method comprising:
actuating an actuator of the autonomous lawn mower to terminate an operation of the autonomous lawn mower, wherein a hood moves from a closed position at which a user control interface of the autonomous lawn mower is covered to an opened position at which the user control interface is exposed in response to actuating the actuator to terminate the operation of the autonomous lawn mower.

45. The method of claim 44, wherein the actuator comprises an emergency shut-off switch, wherein the hood covers the user control interface in the closed position, and wherein the hood pivots between the opened and closed positions.

46. The method of claim 44, wherein actuating the actuator comprises pressing the actuator in a direction towards a chassis of the autonomous lawn mower.

47. The method of claim 44, wherein the actuator is spring biased to a non-actuated state.

48. The method of claim 44, wherein the actuator is disposed at least partially in a recessed portion of the autonomous lawn mower, and wherein actuating the actuator comprises displacing the actuator into the recessed portion.

49. The method of claim 44, wherein the autonomous lawn mower comprises a mower body having at least one motor arranged to drive a cutting blade and to propel the mower body on an operating surface via a wheel arrangement, wherein the mower body includes a navigation system arranged to assist a controller of the autonomous lawn mower to control an operation of the mower body within a predefined operating area.

* * * * *